US012320456B2

(12) United States Patent
Brown

(10) Patent No.: US 12,320,456 B2
(45) Date of Patent: Jun. 3, 2025

(54) COUPLING DEVICE AND A METHOD OF USING A COUPLING DEVICE

(71) Applicant: Glenn Brown, Spring, TX (US)

(72) Inventor: Glenn Brown, Spring, TX (US)

( * ) Notice: Subject to any disclaimer, the term of this patent is extended or adjusted under 35 U.S.C. 154(b) by 47 days.

(21) Appl. No.: 18/057,168

(22) Filed: Nov. 18, 2022

(65) Prior Publication Data

US 2023/0083987 A1    Mar. 16, 2023

Related U.S. Application Data

(63) Continuation-in-part of application No. 16/438,173, filed on Jun. 11, 2019, now abandoned.

(51) Int. Cl.
*F16L 23/08* (2006.01)
*F16L 21/06* (2006.01)
*F16L 37/08* (2006.01)

(52) U.S. Cl.
CPC ............ *F16L 37/082* (2013.01); *F16L 21/065* (2013.01)

(58) Field of Classification Search
CPC ....... F16L 21/065; F16L 23/036; F16L 23/08; F16L 23/10; F16L 23/12; F16L 25/06; F16L 25/065; F16L 25/08; F16L 55/168; F16L 55/1705; F16L 55/172; F16L 55/1725; F16L 41/04; F16L 41/045; F16L 41/065; F16L 41/06; F16L 41/08; F16L 41/086; F16L 41/12; F16L 41/14; F16L 3/105
USPC ................................................ 285/403, 404
See application file for complete search history.

(56) References Cited

U.S. PATENT DOCUMENTS

| 1,066,575 | A | * | 7/1913 | Bates | .................... F16L 55/172 138/99 |
| 3,077,360 | A | | 2/1963 | Israel | |
| 3,963,218 | A | | 6/1976 | Glaesener | |
| 4,225,160 | A | | 9/1980 | Ortloff | |
| 4,486,037 | A | | 12/1984 | Shotbolt | |
| 4,603,605 | A | * | 8/1986 | Miller | ..................... B25B 27/18 81/53.2 |
| 4,840,194 | A | | 6/1989 | Berry | |
| 5,649,797 | A | | 7/1997 | Warren | |
| 5,868,442 | A | | 2/1999 | Lin | |
| 7,549,681 | B1 | | 6/2009 | Matzner | |
| 7,921,536 | B2 | | 4/2011 | Dole | |

(Continued)

FOREIGN PATENT DOCUMENTS

| CN | 107339524 | 11/2017 |
| GB | 1012865 | 12/1965 |
| JP | 2006-177048 | 7/2006 |

OTHER PUBLICATIONS

International Search Report and Written Opinion Issued in Corresponding PCT Patent Application No. PCT/US2020/037281, dated Oct. 20, 2020.

*Primary Examiner* — Aaron M Dunwoody
(74) *Attorney, Agent, or Firm* — Norton Rose Fulbright US LLP

(57) ABSTRACT

This disclosure provides systems, methods, and devices for a coupling device. In an aspect, a coupling device is configured with at least one fastener for compressing and also opening the coupling and a pushing bolt configured to apply an unlocking force on an object to be coupled by the coupling device. In another aspect, a method for engaging or disengaging a coupling device is disclosed. Other aspects and features are also claimed and described.

20 Claims, 27 Drawing Sheets

(56) References Cited

U.S. PATENT DOCUMENTS

| | | |
|---|---|---|
| 8,739,863 B2 | 6/2014 | Linde et al. |
| 2008/0121284 A1* | 5/2008 | Knaus ..................... F16L 41/12 137/15.14 |
| 2017/0122470 A1 | 5/2017 | Box |
| 2018/0023736 A1 | 1/2018 | Brown |
| 2019/0003621 A1 | 1/2019 | Brown |

* cited by examiner

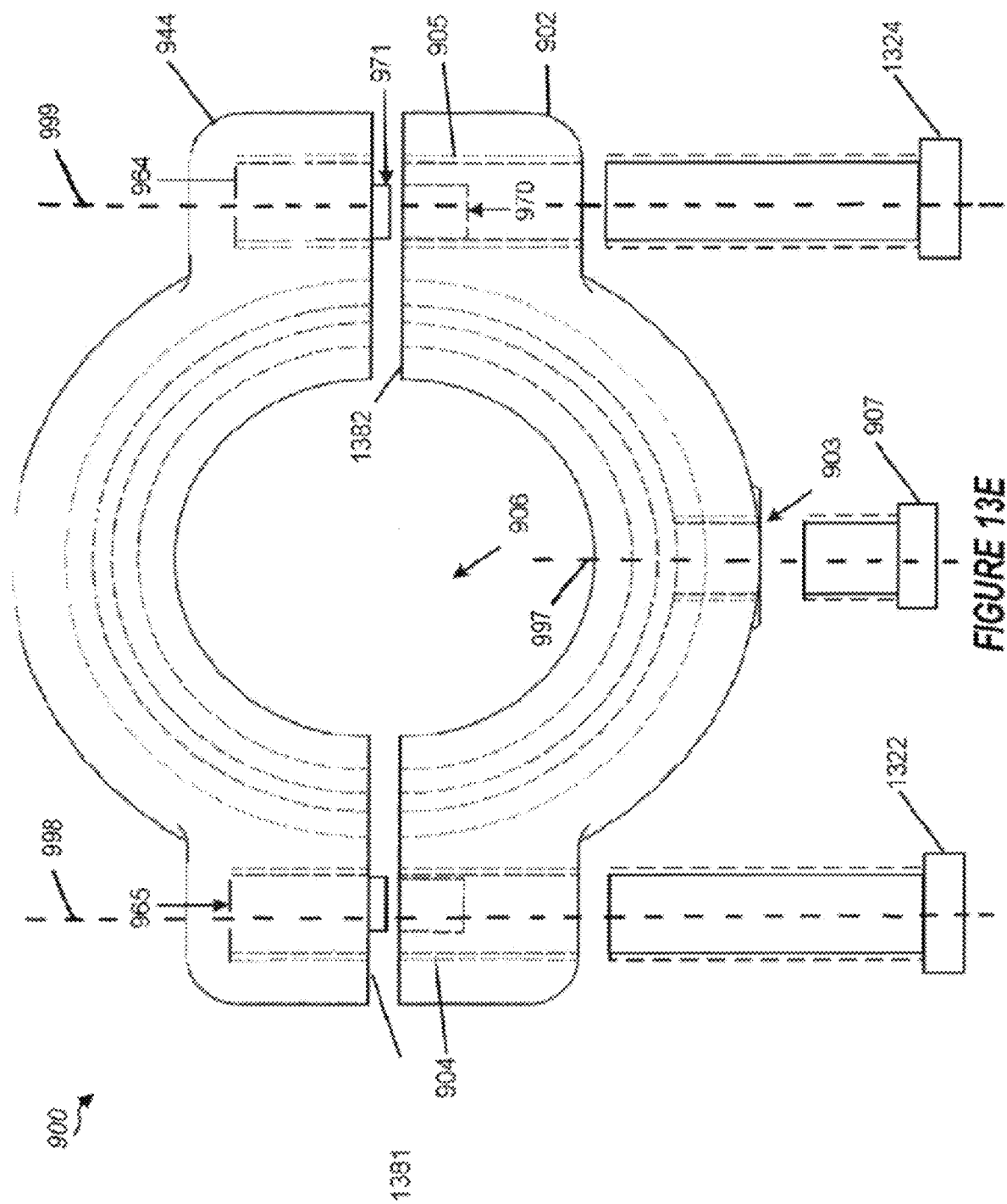

COUPLING DEVICE AND A METHOD OF USING A COUPLING DEVICE

CROSS-REFERENCE TO RELATED APPLICATIONS

This application is a continuation-in-part of U.S. patent application Ser. No. 16/438,173 filed Jun. 11, 2019, which is incorporated by reference in its entirety.

TECHNICAL FIELD

The present disclosure relates to a mechanical coupling, and in particular, a coupling device configured to open and close mechanically with a pushing bolt configured to apply an unlocking force to a coupled object.

INTRODUCTION

Conventional compression couplings have been configured only to connect two or more separate devices (e.g., a hose, a manifold, etc.) together. The conventional compression coupling is provided in at least two parts which fit around connection areas (e.g., shaft, neck, etc.) of the two devices being coupled. On many applications, such as industrial applications and cryogenic applications, the conventional compression couplings are able to be effectively coupled; however, the conventional compression couplings often become seized together with the devices they are coupled, thus making it difficult for operators to decouple the separate devices.

SUMMARY

The present disclosure relates to couplings for attaching various mechanical devices, such as hoses, manifolds, and similar connections. More particularly, the present disclosure pertains to a coupling that includes at least one fastener configured to open the coupling and at least one pushing bolt configured to apply an unlocking force. The present disclosure addresses the problems described above and other problems of prior art systems and methods which will become apparent to one skilled in the art from the description below.

In some aspects, a coupling includes a first coupling section and a second coupling section. The first coupling section and the second coupling section are configured to form an aperture. For example, the aperture may be formed when the first coupling section and the second coupling section are coupled together in a coupled state. The coupling further includes a threaded bore formed in and extending through the second coupling section into the aperture. The coupling also includes a pushing bolt configured to engage the threaded bore of the second coupling section and extend through the threaded bore and into the aperture formed by the first and second coupling sections to apply an unlocking force on an object positioned inside the aperture.

In some aspects, the coupling device further includes a first fastener configured to engage a second threaded bore formed in the second coupling section and move the first coupling section and the second coupling section towards each other when a closing force is applied to the first fastener. In some aspects, the unlocking force is applied to the object positioned inside the aperture in a threaded region of the second coupling section. In some aspects, the pushing bolt is configured to extend into the aperture beyond an inner surface of the second coupling section a predetermined distance.

In some aspects, the coupling further includes a first contact surface formed on the first coupling section, a second contact surface formed on the second coupling section, and a stepped bore formed in the first coupling section. In some implementations, the stepped bore is coaxial with the second threaded bore of the second coupling section. In some aspects, the coupling also includes, a first section formed in the stepped bore, and a second section formed in the stepped bore. In some aspects, the first section has a first diameter and the second section has a second diameter. In some aspects, the first fastener is situated inside the stepped bore.

In some aspects, the first contact surface and the second contact surface of the coupling directly contact each other when the closing force is applied to the first fastener, and the first contact surface and the second contact surface separate from each other when the opening force is applied to the first fastener. In some aspects, the closing force is applied to the first fastener in a first direction, the opening force is applied to the first fastener in a second direction, the first section and the second section are coaxial, and the diameter of the second section is greater than a diameter of the first section. In some aspects, a snap ring is attached to the first fastener. The snap ring may have a diameter larger than the diameter of the first section of the stepped bore. In some aspects, the first fastener is a jack screw.

In some aspects, a method of mechanically decoupling a first mechanical device from a second mechanical device uses a coupling device. The method includes applying a loosening force to an unlocking bolt of a coupling device and applying an unlocking force to a pushing bolt of the coupling device. The unlocking force may be applied by an operator. The method also includes determining whether the coupling device can be removed from the first and second mechanical devices by hand operation. The method further includes applying a second unlocking force to the pushing bolt based on determining whether the coupling device can be removed from the first and second mechanical devices by hand operation. The method includes decoupling the first and second mechanical devices by rotating the coupling device by hand operation.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific examples disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings. The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the aspect depicted in the figures.

FIG. 13E is a coupling including the coupling section of FIGS. 9A-9D and the coupling section of FIGS. 13A-13C according to one or more aspects.

DETAILED DESCRIPTION

Various aspects and examples of a coupling, such as a compression coupling, shall be described with reference to FIGS. 1-3, 4A, 4B, 5-8, 9A-9D, 10A, 10B, 11, 12, 13A-13E, and 14A-14E. The particular features of the disclosed examples should not be limited to just those illustrated configurations. Instead, the various features disclosed within this disclosure may be combined to create exponentially more examples not explicitly illustrated within this disclosure. To illustrate, the various fasteners and configurations for opening and closing the clamshell coupling which are disclosed within may be combined in far more configurations than illustrated within the confines of this disclosure.

In the following description, numerous specific details are provided to provide a thorough understanding of the disclosed aspects and examples. One of ordinary skill in the relevant art will recognize, however, that aspects of the disclosure may be practiced without one or more of the specific details, or with other methods, components, materials, and so forth. In other instances, well-known structures, materials, or operations are not shown or described in detail to avoid obscuring aspects of the disclosure.

Figure 1:
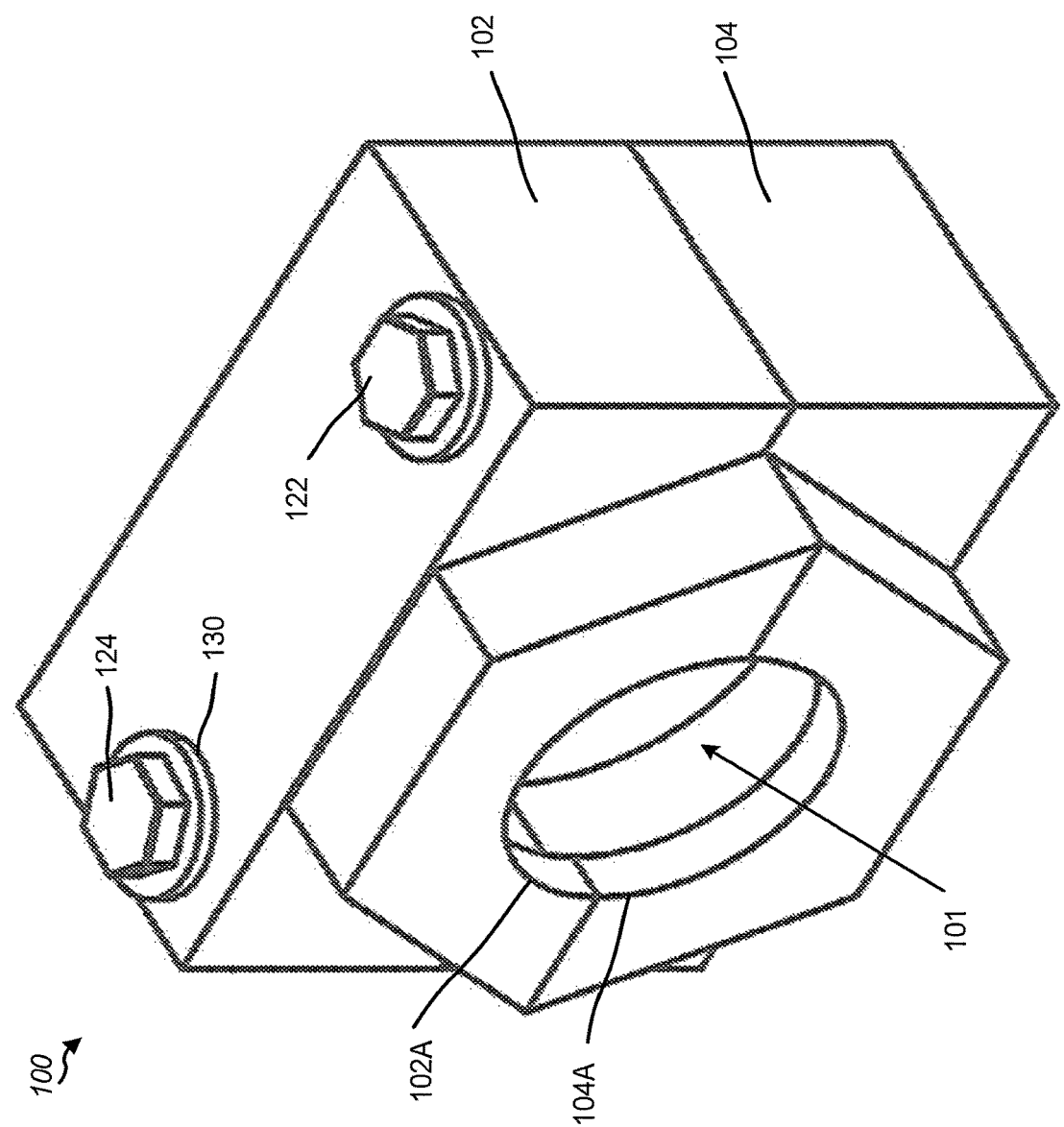
FIG. 1 is a perspective view of a coupling according to one or more aspects.

FIG. 1 shows a perspective view of a coupling 100 according to one or more aspects. Coupling 100 may include multiple sections. For example, as shown in FIG. 1, coupling 100 includes two separable sections, such as a first section 102 and a second section 104.

Coupling 100 may include sections, such as first section 102 and second section 104, held together by various fasteners. For example, the various fasteners may include one or more a hinges (e.g., 224, 324, etc.), one or more unlocking bolt(s) (e.g., 122, 124, etc.), or a combination thereof. An example of a hinge is described further herein at least with reference to FIG. 6 including a hinge 224 or FIG. 7 including hinge 324.

As shown in FIG. 1, coupling 100 is configured to be held together a first fastener 122 and a second fastener 124. Stated in a different manner, first section 102 is connected to second section 104 by first fastener 122, second fastener 124, or a combination thereof. First fastener 122 may include an unlocking blot, such as a jack screw. Additionally, or alternatively, second fastener 1124 may include a bolt, such as an unlocking bolts, such as a jack screw. It is noted that the terms "jack screw", "locking/unlocking bolt", or "unlocking bolt" may be used interchangeable herein. In some implementations, first fastener 122 and second fastener 124 may be threaded per the specification and size required for a particular application.

Coupling 100 includes an aperture 101 configured to surround two or more components (e.g., fittings, such as a hose, a manifold, etc.) that are being coupled (by coupling 100). To illustrate, aperture 101 may be formed or defined based on first section 102 and second section 104, such as when first section 102 and second section 104 are coupled together. As shown, aperture 101 is divided between first section 102 and second section 104 such that aperture 101 includes or is defined by a first portion 102A and a second portion 104A. In some implementations, aperture 101 has a circular circumference configured to mirror the circumference of the components being fitted. It should be understood that the shape of aperture 101 may be adapted to fit the particular shape of the components being coupled (e.g., hexagon, etc.).

Additionally, it is noted that coupling 100 may include multiple openings, such as a first opening defined or formed on a first side of coupling 100 and a second opening defined or formed on a second side of coupling 100, the second side opposite the first side. Coupling 100 may include or define a through channel between the first opening and the second opening. Accordingly, coupling 100 may be configured to a first components (e.g., a hose) via the first opening to a second component (e.g., a manifold) via the second opening. When the first component and the second component are coupled together by coupling 100, a flow path is established between the first component and the second component, such that flow (e.g., of a liquid) may occur, via coupling 100, between the first component and the second component.

Figure 2:
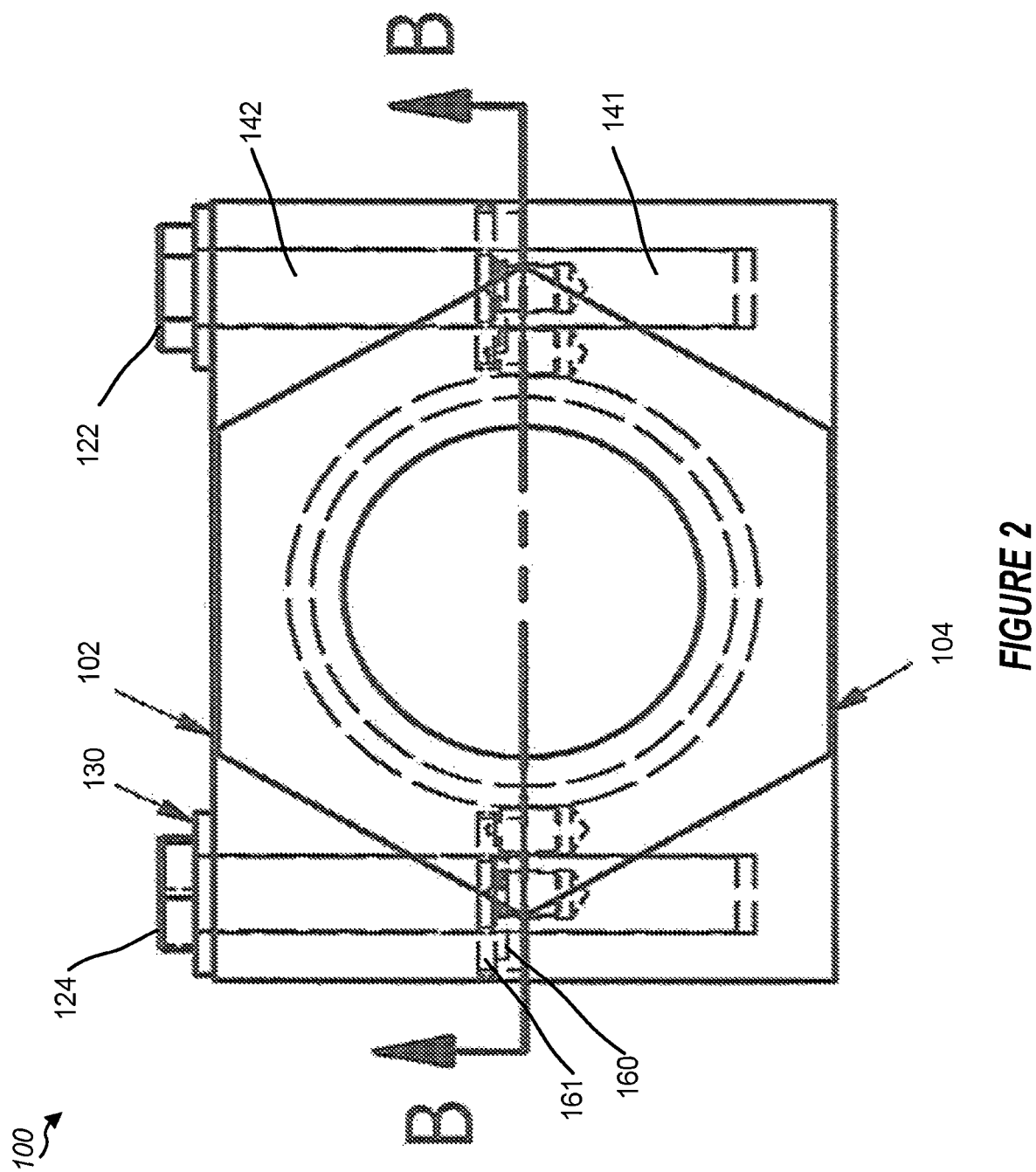
FIG. 2 is a front view of a coupling according to one or more aspects.

FIG. 2 shows a front view of coupling 100 according to one or more aspects. First section 102 and second section 104 may include one or more bore(s), such as a first bore 142 and a second bore 141, respectively. The one or more bores may be configured to accommodate a fastener, such as a jack screw. For example, first bore 142 and second bore 141 may be configured to accommodate first fastener 122. In some implementations, at least a portion of first bore 142 is unthreaded and at least a portion of second bore 141 is threaded. In order to couple two or more components by coupling 100, first section 102 and second section 104 fit together to create a coupling assembly (e.g., coupling 100) that completes (e.g., defines or forms) the circumference of aperture 101. In some implementations, first section 102 and second section 104 may be fit together using one or more fasteners, such as first fastener 122 and second fastener 124.

Figure 3:
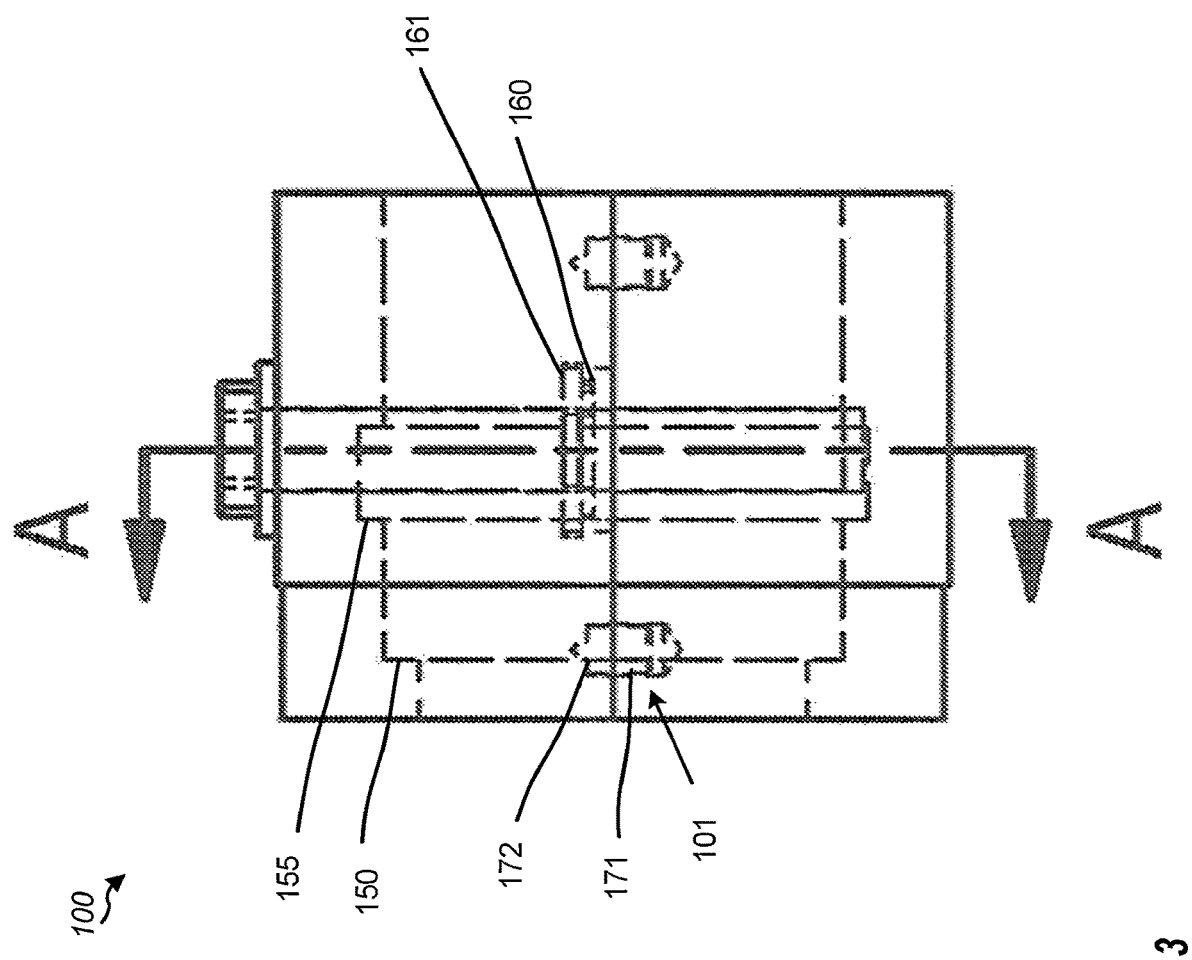
FIG. 3 is a side view of a coupling according to one or more aspects.

In some implementations, one or more fasteners, such as first fastener 122 and second fastener 124, may incorporate one or more washers, such as representative washer 130. The one or more fasteners (e.g., first fastener 122 and/or second fastener 124) may be held in place with a snap ring, such as a representative snap ring 160. In some configurations, snap ring 160 is configured to prevents the one or more fasteners, such as first fastener 124 (e.g., a first jack screw) or second fastener 124 (e.g., a second jack screw), from becoming separated from first section 102. Additionally, or alternatively, a washer 161 may be included. It should be understood that various alternatives exist for snap ring 160, such as a sleeve which covers a larger portion of first fastener 122 and/or second fastener 124. In conjunction with the one or more fasteners, snap ring 160 may be configured to assist in separating first section 102 from second section 104—e.g., loosening or opening coupling 100. In some implementations, first bore 142 of first section 102 is an unthreaded bore 142 and second bore 141 of second section 104 is a threaded bore. In this configuration, rotating the fasteners, such as the first fastener 122 and the second fastener 124, counterclockwise opens coupling 100 (e.g., separates first section 102 and second section 104). Additionally, rotating the fasteners, such as the first fastener 122 and the second fastener 124, clockwise closes coupling 100 (e.g., couples or joins first section 102 and second section 104 into contact). In other implementations, threading of the fastener and the threaded bore may be different such that a clockwise rotation opens and a counterclockwise rotation closes FIG. 3 shows a side view of a coupling 100 according to one or more aspects. The aperture 101 of coupling 100 includes different apertures (e.g., 150 and 155) in order to prevent separation of the two or more components (e.g., fittings, such as a hose, a manifold, etc.). Further, coupling 100 may include one or more structures or features configured to align first section 102 and second section 104 together. The one or more structures or features may also be configured to reduce the torsional strain on the fasteners, such as first fastener 122 and second fastener 124. For example, second section 104 may include alignment dowels 170, each with a protrusion 171 ("alignment dowel" or "male" portion) which fits into a similarly sized and shaped cavity 172 ("female" portion) in first section 102. In some implementations, alignment dowels 170 may be placed throughout coupling 100 to secure first section 102 and second section 104 together. It typically does not matter which section has the male portion or corresponding female portion; accordingly, in other implementations, second section 104 may include at least one cavity (e.g., 172) and first section 102 may include at least one protrusion 171. In some implementations, first section 102 includes a first cavity and a first protrusion, and second section 104 includes a second cavity and a second protrusion, such that the first protrusion is configured to fit into the second cavity and the second protrusion is configured to fit into the first cavity. Further, it should be understood that the one or more structures or features may include other structures or features that may be used to align first section 102 and second section 104 together. As illustrative, non-limiting examples, the other structures or features may include a ridge on one section and corresponding valley on the other section, or a lip extending around the perimeter on one section which surrounds the perimeter of the other section (e.g., shoebox lid). The other structures may be used with, or as an alternative to, with alignment dowels 170—e.g., protrusion 171 and cavity 172.

Figure 4A:
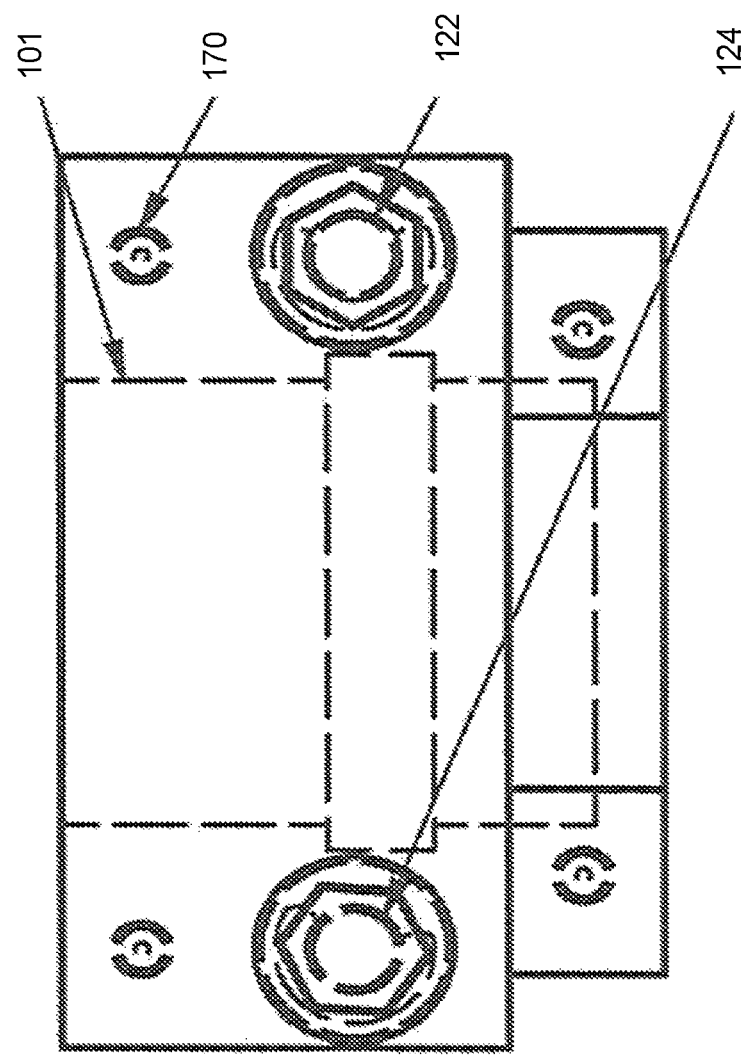
FIGS. 4A and 4B are a top and bottom view, respectively, of an exemplary coupling section according to one or more aspects.
Figure 4B:
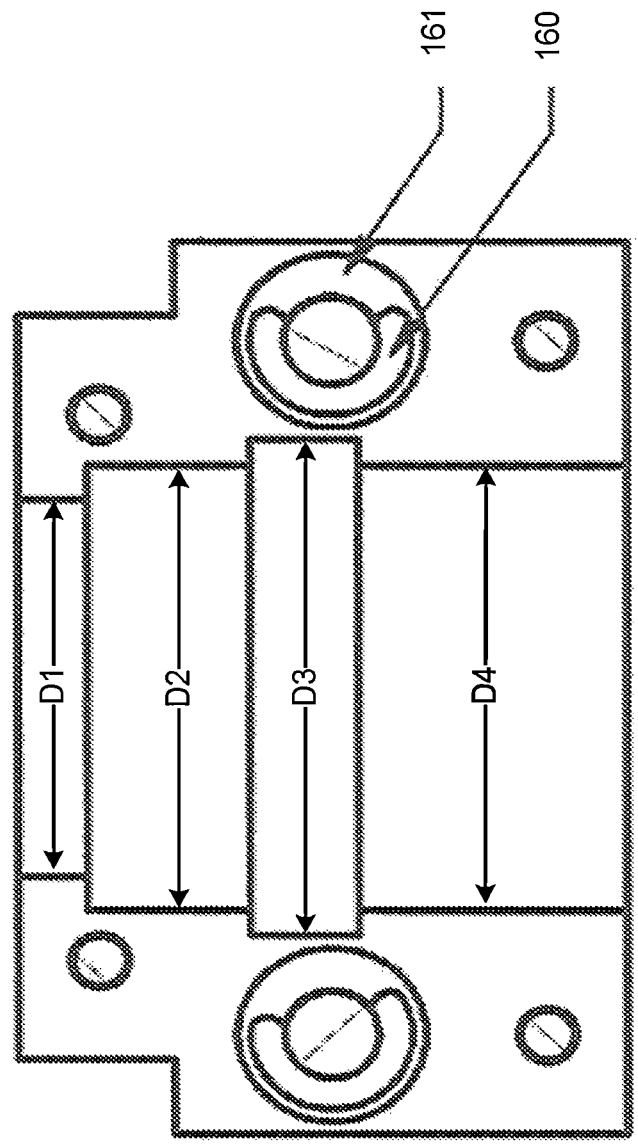

FIGS. 4A and 4B show a top and bottom view, respectively, of an exemplary section 102 according to one or more aspects. For example, FIG. 4A shows a top view of an exemplary first section 102 and FIG. 4B shows a bottom view of an exemplary first section 102. It is noted that the bottom view of FIG. 4B corresponds to the section line shown in FIG. 2. In some implementations, first fastener 122 and second fastener 124 may be threaded per the specification and size required for a particular application. Additionally, or alternatively, alignment dowels 170 may be placed throughout coupling 100 to secure first section 102 and second section 104 together. For example, as shown in FIG. 4A, first section 102 includes four alignment dowels. In other implementations, first section 102 may include fewer or more than four alignment dowels or no alignment dowels. Aperture 101 may be configured to accommodate two or more components (e.g., fittings, such as a hose, a manifold, etc.) that coupling 100 will be mating (e.g., coupling), such as 2.4-4 Stub ACME-2G-RH-INT to 2.4-4 Stub ACME-2-G-RH-EXT as an illustrative, non-limiting example.

Referring to FIG. 4B, snap ring 160 is configured to prevent first fastener 122 and second fastener 124 from separating from first section 102. Further, the connection of snap ring 160 with first section 102 allows coupling 100 to open mechanically when first fastener 122 and second fastener 124 are rotated, which is typically a counterclockwise rotation, but is dependent upon the direction of the threading of the fastener and the threaded bore.

In some implementations, aperture may include different diameters between a first side of coupling 100 and a second side of coupling 100 that is opposite of the first side. For example, referring to section 102 of FIG. 4B, coupling 100 includes a first diameter D1, a second diameter D2, a third diameter D3, and a fourth diameter D4. It is noted that a portion of one or more regions corresponding to the first, second, third, or fourth diameters D1-D4 may be threaded. For example, a region of aperture corresponding to D4 may be threaded—e.g., both sections 102 and 104 may have corresponding threaded regions.

Figure 5:
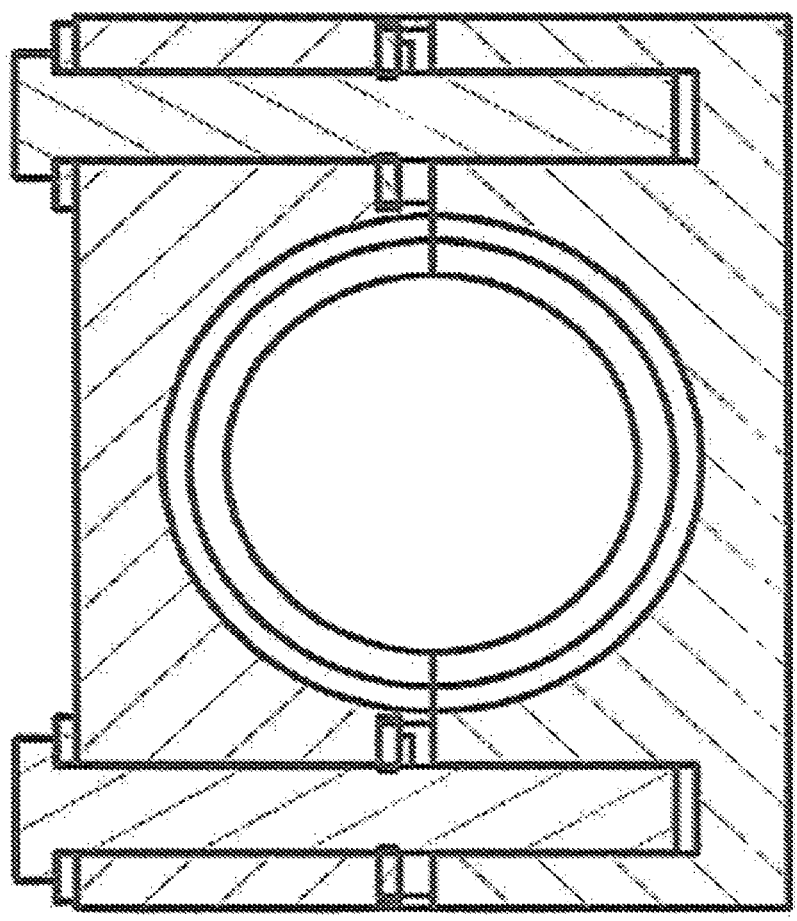
FIG. 5 is a cross section of a coupling according to one or more aspects.

FIG. 5 shows a cross section of the coupling 100 according to one or more aspects. The cross sectional view of FIG. 5 is identified in FIG. 3 as the section line A-A.

In some implementations, first fastener 122 and second fastener 124 includes jack screws or similar fasteners, coupling 100 tightens one or more sealing surfaces together by linearly compressing one or more sealing surfaces against one or more corresponding sealing surfaces of at least one fitting (this may include sealing surfaces that use gaskets), which can be accomplished using a standard sized wrench. Stated in a different manner, first fastener 122 and second fastener 124 may be operated using a wrench to bring together and linearly compress a sealing surface of coupling 100, such as a first surface of first section 102 and a second surface of second section 104, with a sealing surface of at least one fitting, such as a male fitting. In some implementations, a gasket may be used to couple coupling 100 and the at least one fitting.

To open coupling 100, coupling 100 loosens one or more sealing surfaces from one or more corresponding sealing surfaces of at least one fitting by moving apart first section 102 and second section 104 from each other. When first section 102 and second section 104 move apart, the tight bond of the at least on fitting (e.g., the male fitting) and coupling 100 is loosened ("broken loose") without the use of a hammer or similar tool. In some implementations, coupling 100 is loosened and removed by untightening/loosening first fastener 122 and second fastener 124. This allows coupling 100 to be opened to varying positions and rotated by hand or with a wrench. This configuration allows the sealing surfaces to be disconnected from their corresponding fitting sealing surfaces. As such, the unsafe hammering to "break loose" coupling 100 when the transfer of fluid (or similar) is complete is no longer needed. Coupling 100 can be used in place of standard couplings on existing fittings, and as such, no retrofit of the existing delivery end or existing receiving end is necessary.

Figure 6:
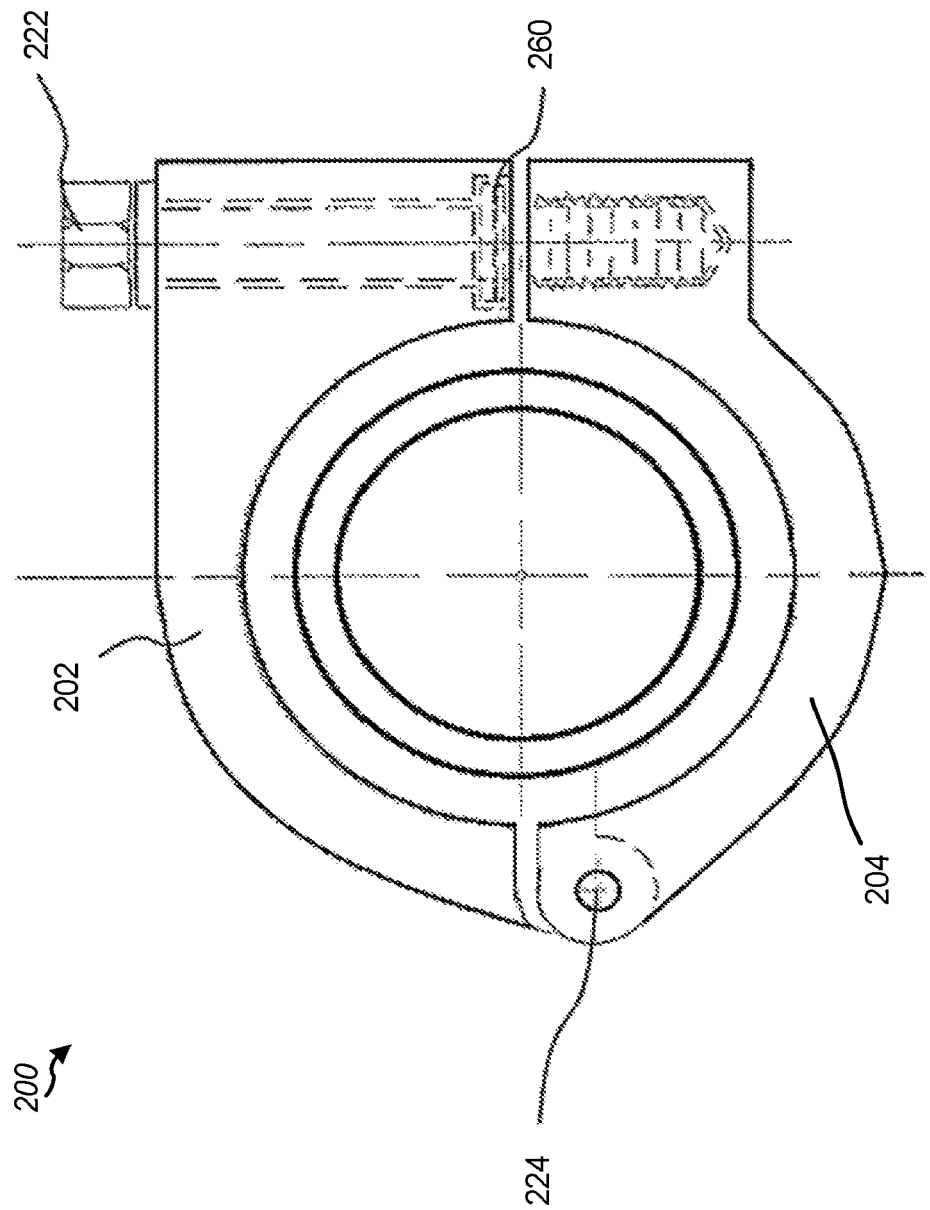
FIG. 6 is a coupling with various fasteners according to one or more aspects.

FIG. 6 shows a coupling 200 with various fasteners according to one or more aspects. In some implementations, coupling 200 is a clamshell coupling that includes a first section 202, a second section 204, a hinge 224, a fastener 222, and a snap ring 260. As shown, the coupling 200 includes a hinge fastener. It should be understood that some implementations, a pivot point (e.g., hinge 224) may be used in place of a jack screw (e.g., first fastener 124), as shown by coupling 200 in FIG. 6. Stated in a different manner, as compared to coupling 100, coupling 200 includes hinge 224 instead of first fastener 122 as used with coupling 100. In such a configuration, coupling 200 includes a fastener 222, such as a jackscrew, that is configured to open and close coupling 200 about the pivot point. Snap ring 260 secures fastener 222 to first section 202. A bore of first section 202 may be configured (e.g., enlarged) to accommodate for the arcuate opening direction of coupling 200. Alternatively, fastener 222 may use a pivoting attachment point attach to first section 202, in which the attachment point pivots on an axis that is parallel with hinge 224 (e.g., a sleeve surrounding the jack screw that also includes an attachment pin with a pivot axis parallel to the hinge pivot axis).

Alternatively, it should be understood that some implementations may use one unitary section instead of two separable sections, such as first section 202 and second section 204. For example, coupling 200—or at least a portion of coupling 200—may be created out of a metal, polymer, plastic, or other similar material that is sufficiently rigid to act as a coupling but yet pliable enough to open far enough to release coupling 200, and as such, coupling 200 may use a single unlocking bolt but not require a hinge/pivot point.

Figure 7:
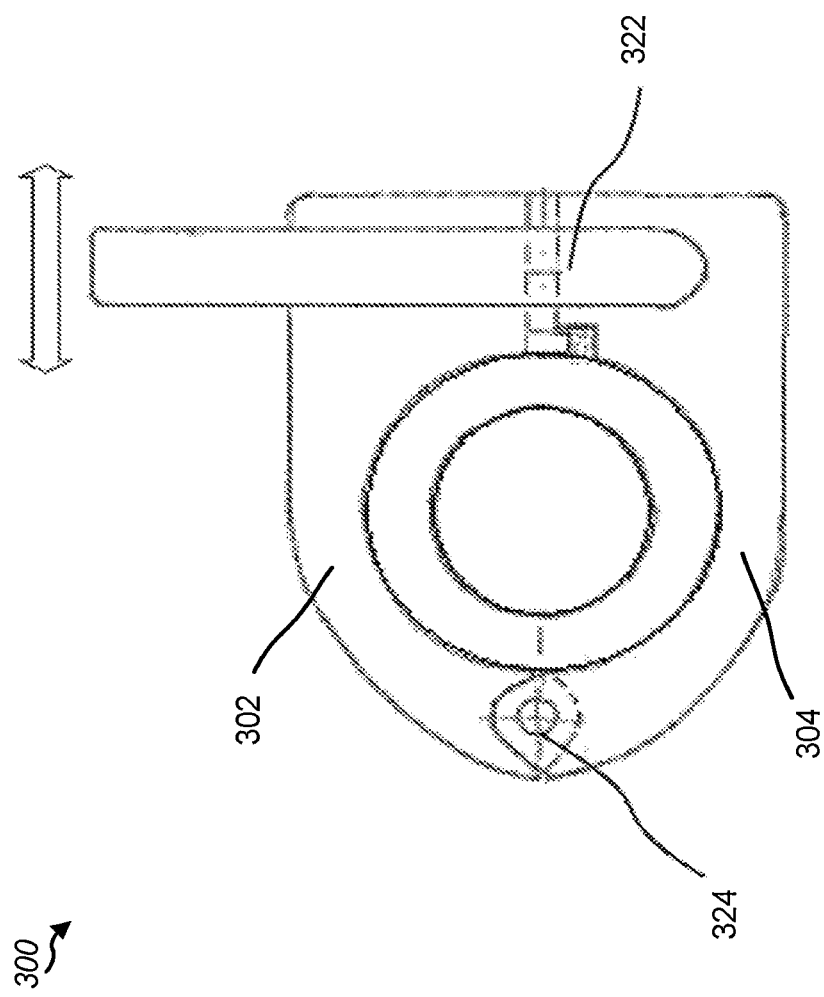
FIG. 7 is a coupling with various fasteners according to one or more aspects.

FIG. 7 shows a coupling 300 with various fasteners according to one or more aspects. As additional examples of possible fasteners, coupling 300 includes a latch fasteners 322. Coupling 300 includes a hinge 324. Latch fastener 322 is configured to open and close by rotating, as shown by the arrow. An internal latch on latch fastener 322 is configured to lock the two sections (e.g., a first section 302 and a second section 304 of coupling 300) together when rotated. An internal cam on the latch opens the two sections when rotated the other direction. Second section 304 is configured with a bore to accept latch fasteners 322. Further, second section 304 may be configured with channels/recesses to accept the internal latch and internal cam.

Figure 8:
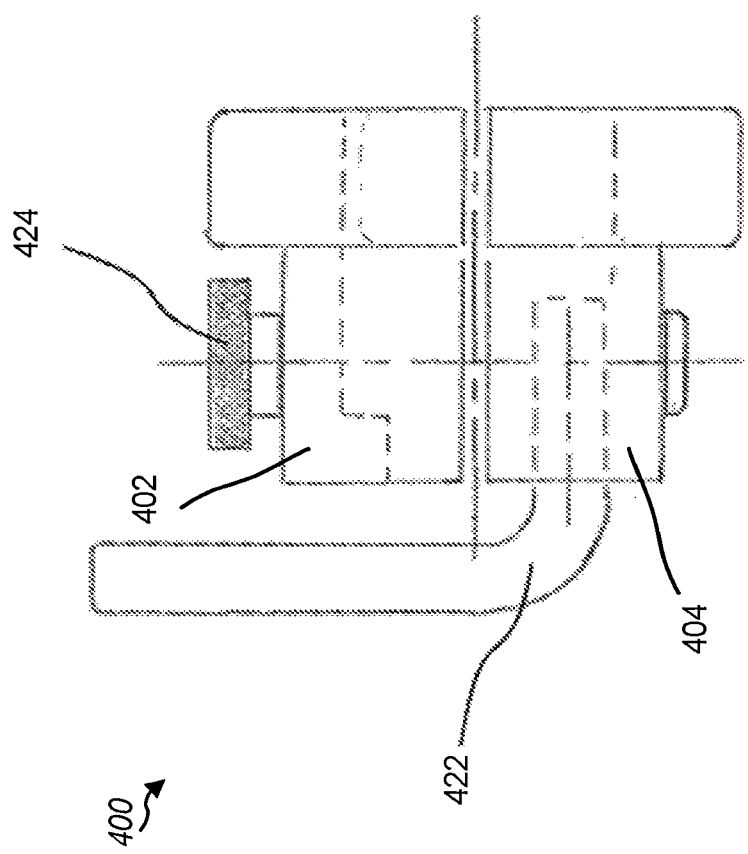
FIG. 8 is a coupling with various fasteners according to one or more aspects.

FIG. 8 shows a coupling 400 with various fasteners according to one or more aspects. As additional examples of possible fasteners, coupling 400 include a latch fasteners 422. Coupling 400 includes a fastener 424, such as a jack screw. Latch fastener 422 is configured to open and close by rotating. An internal latch on latch fastener 422 locks the two sections (e.g., a first section 402 and a second section 404 of coupling 400) together when rotated. An internal cam on the latch opens the two sections when rotated the other direction. Second section 404 is configured with a bore to accept latch fasteners 422. Further, second section 404 may be configured with channels/recesses to accept the internal latch and internal cam.

Figure 14A:
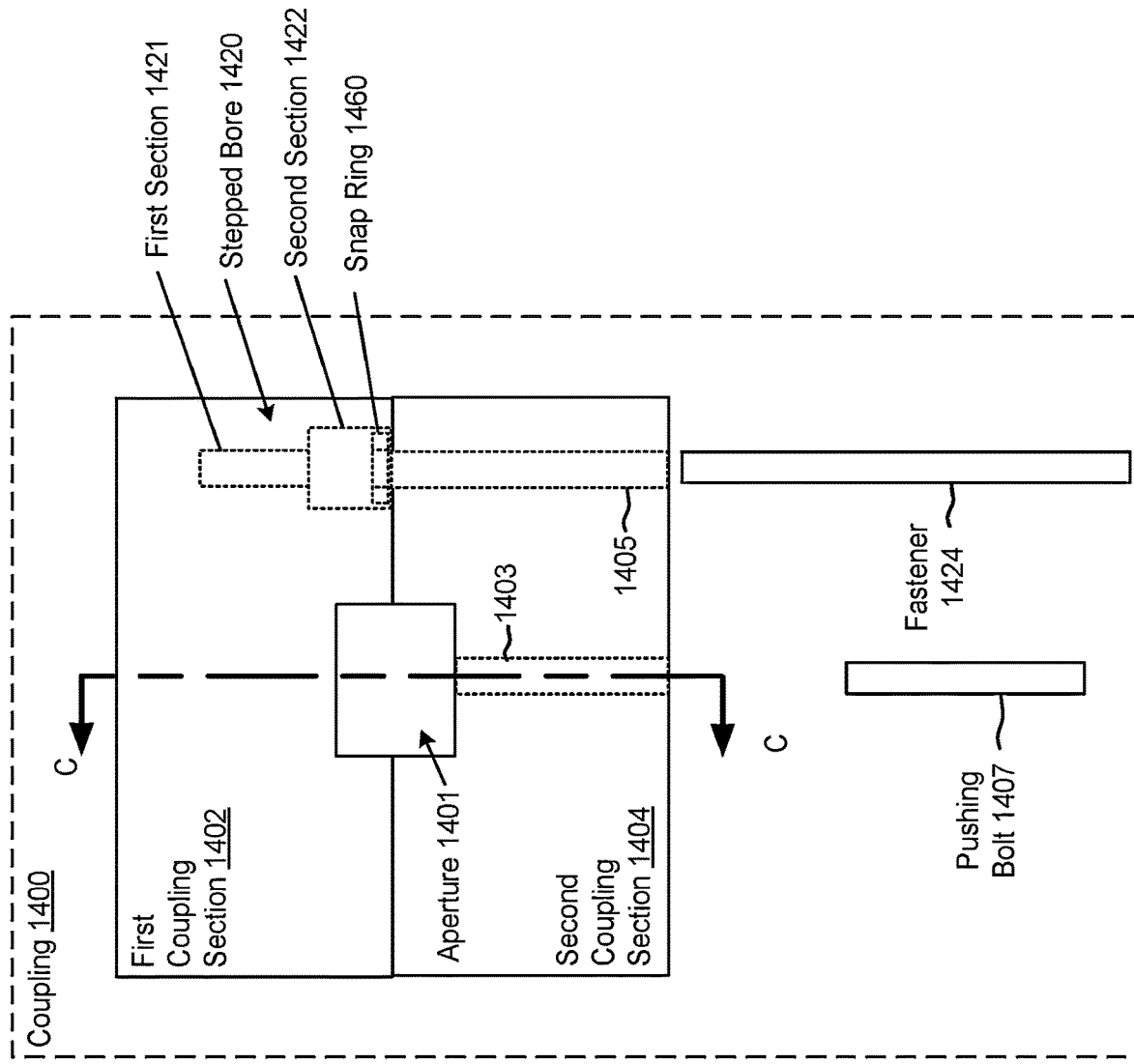
FIGS. 14A-14E are a coupling according to one or more aspects.
Figure 14B:
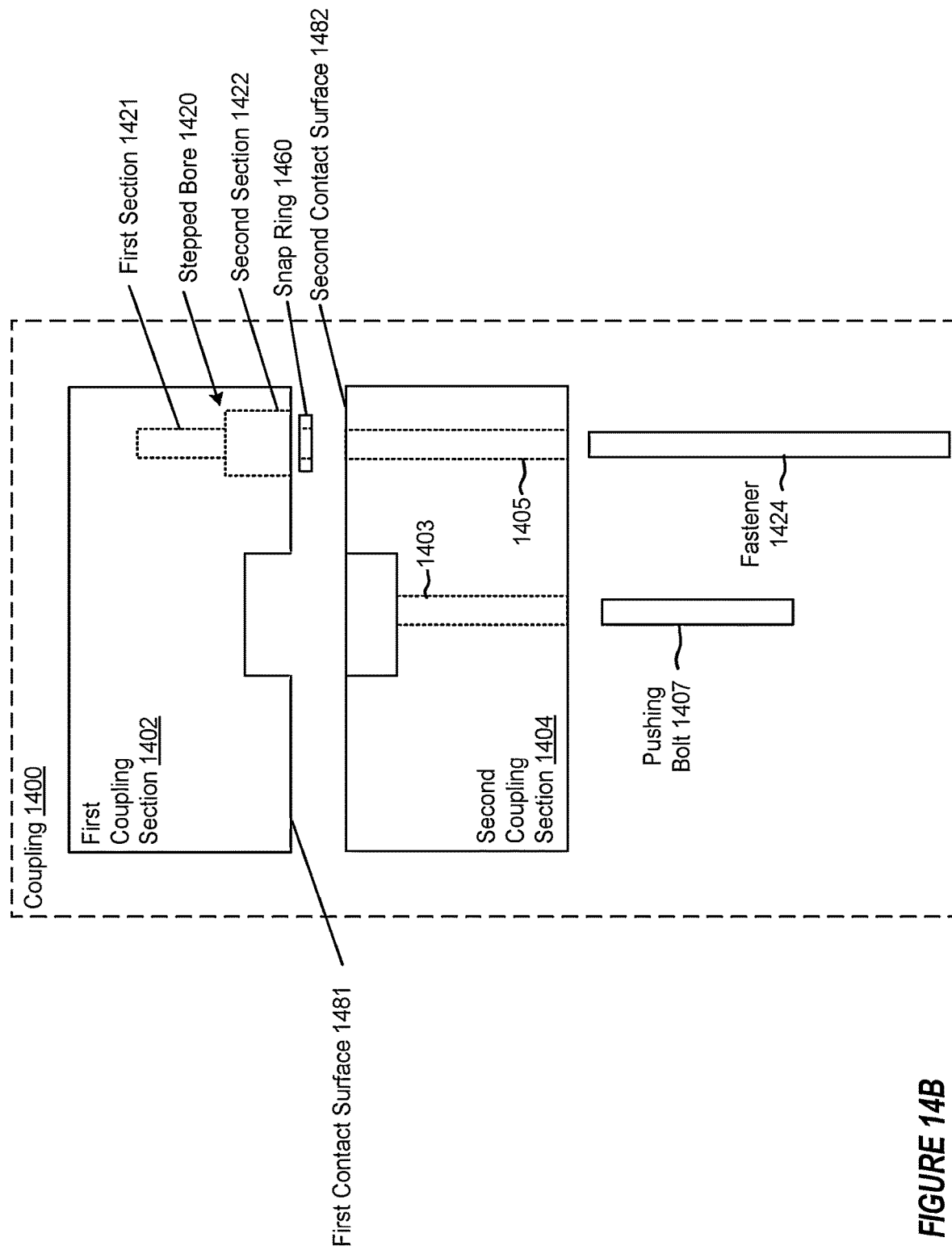
Figure 14C:
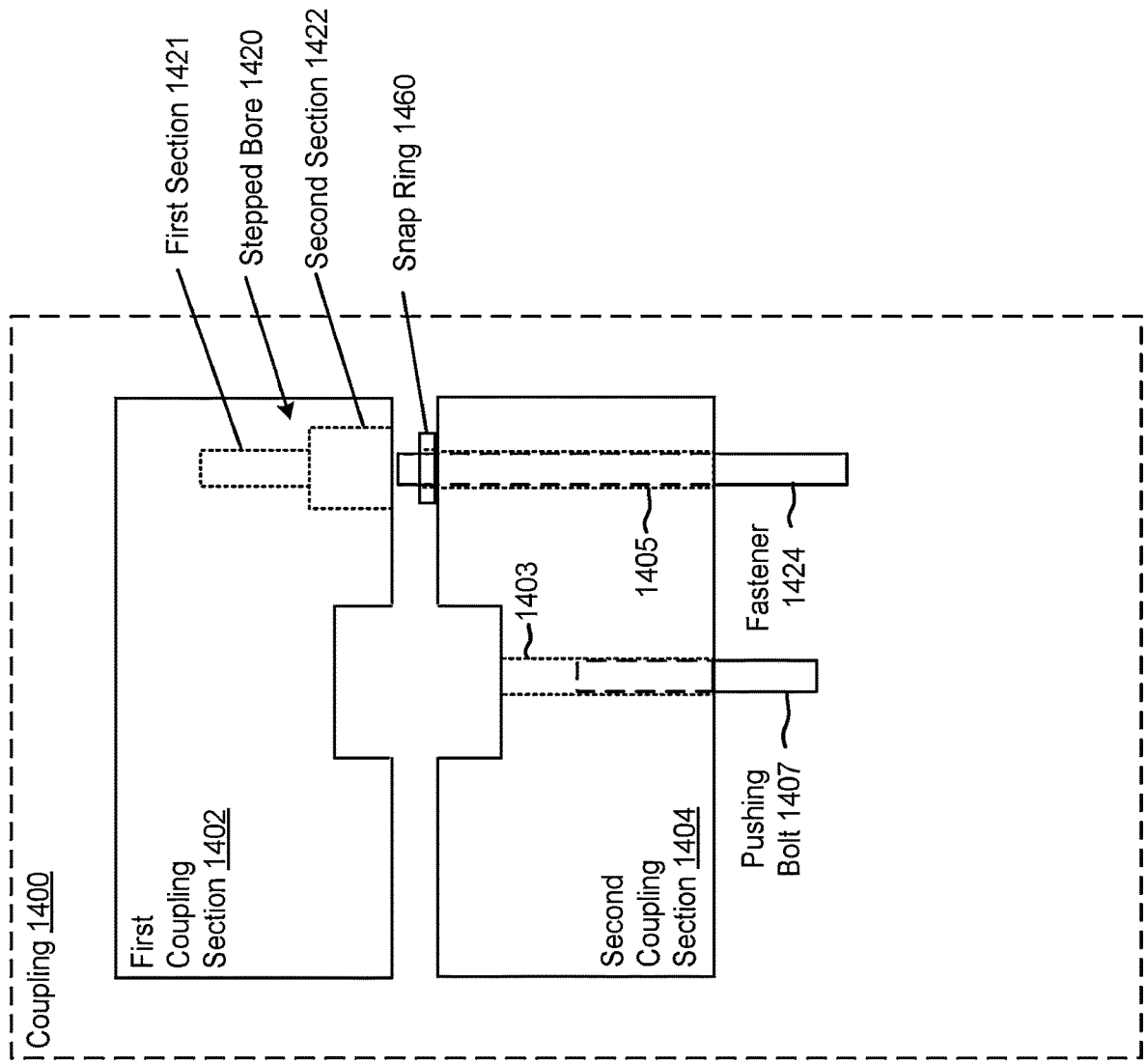
Figure 14D:
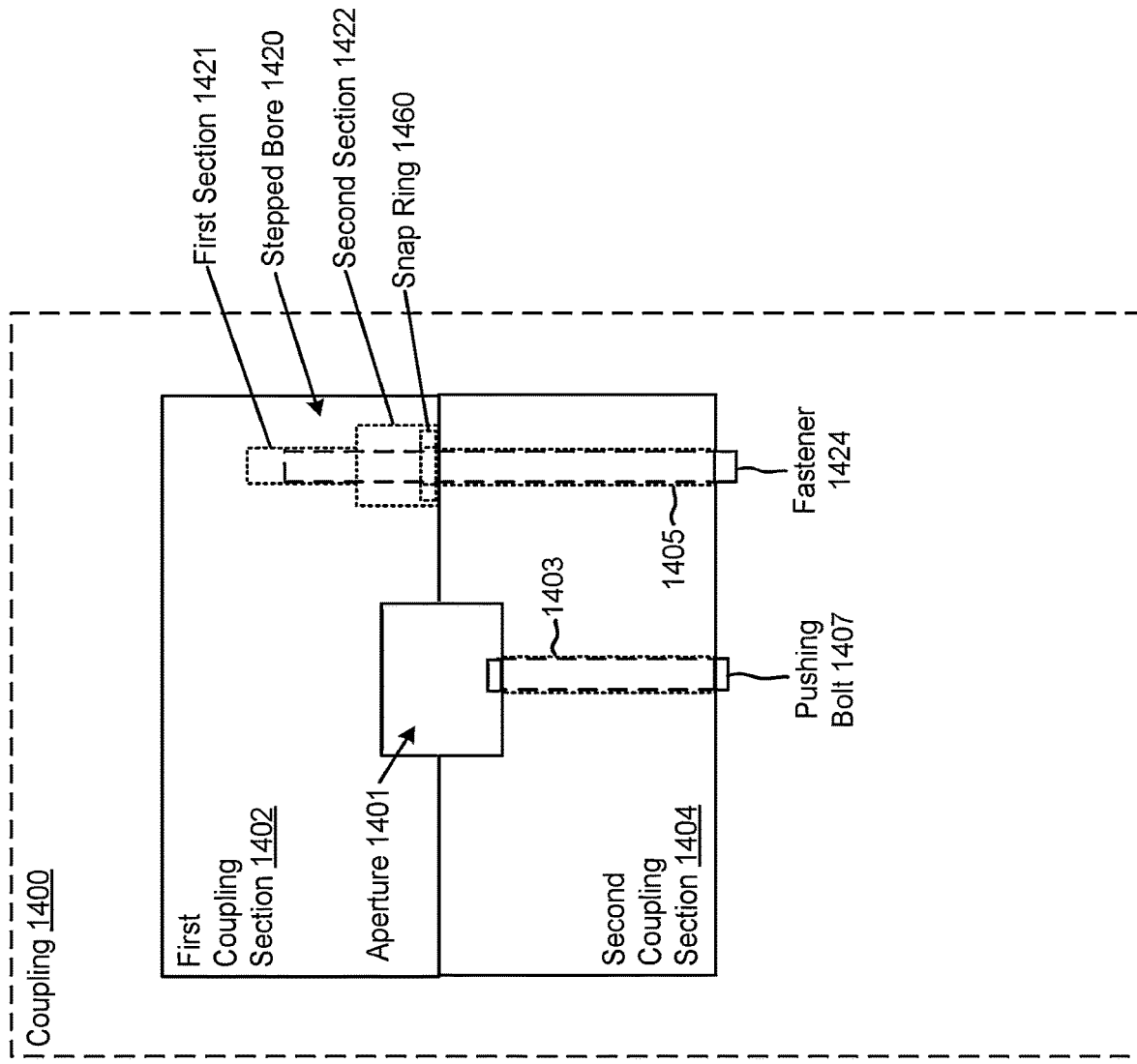
Figure 14E:
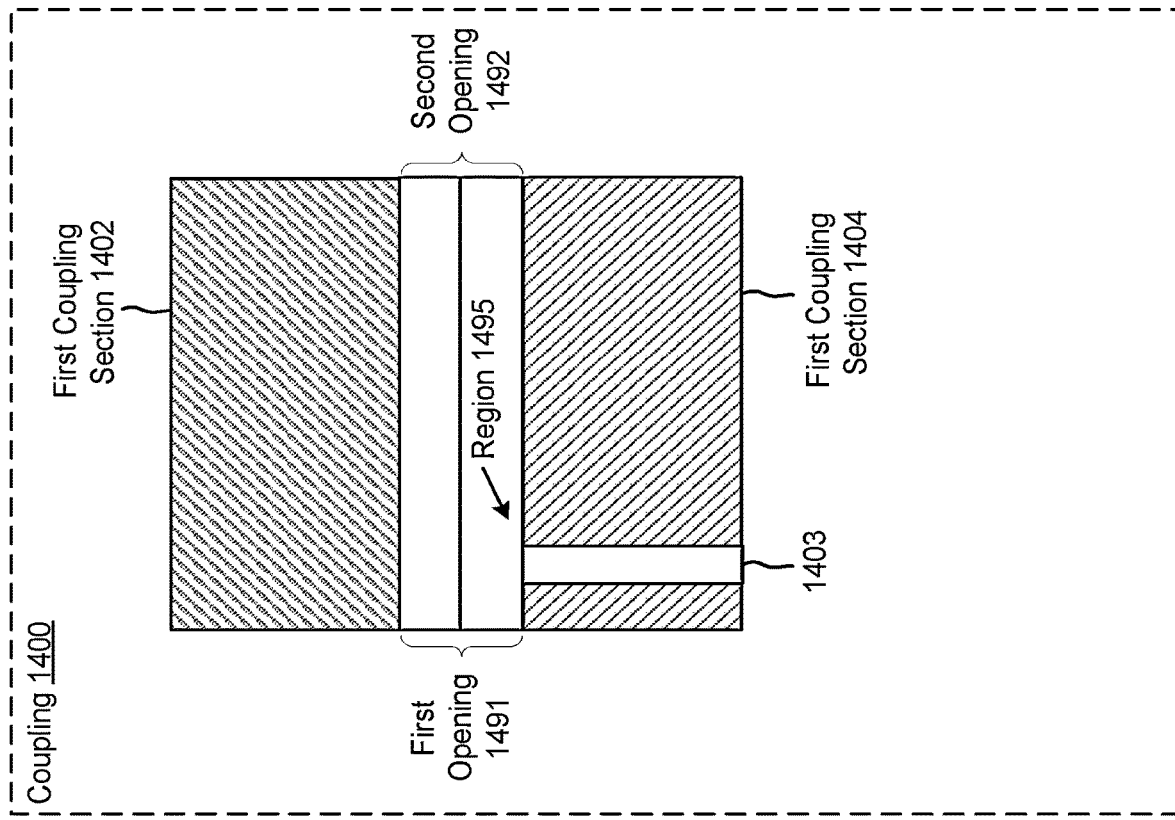

Referring to FIGS. 14A-14E, a coupling 1400 according to one or more aspects is shown. FIG. 14A is a first example of coupling 1400 according to one or more aspects. FIG. 14B is a second example of coupling 1400 according to one or more aspects. FIG. 14C is a third example of coupling 1400 according to one or more aspects. FIG. 14D is a fourth example of coupling 1400 according to one or more aspects. FIG. 14E is a cross sectional view of coupling 1400 along section line C-C of FIG. 14A. Coupling 1400 may include or correspond to coupling 100, 200, 300, or 400.

Referring to FIGS. 14A-14E, coupling 1400 includes a first coupling section 1402 and a second coupling section 1404. First coupling section 1402 may include or correspond to first section 102, first section 202, first section 302, or first section 402. Second coupling section 1404 may include or correspond to second section 104, second section 204, second section 304, or second section 404.

First coupling section 1402 and second coupling section 1404 are configured to form an aperture 1401. For example, aperture 1401 may be formed when first coupling section 1402 and second coupling section 1404 are coupled together in a coupled state, such as the coupled state shown in at least FIG. 14D. Aperture 1401 may include or correspond to aperture 101, or an aperture of coupling 200, coupling 300, or coupling 400.

In some implementations, aperture 1401 of coupling 1400 may include or be associated with a first opening 1491 and a second opening 1492. First opening 1491 may be on a first side of coupling 1400 and second opening 1492 may be on a second side of coupling 1400 that is opposite the first side. In some implementations, first opening 1491 and second opening 1492 are the same shape, the same size, or a combination thereof. Alternatively, first opening 1491 and second opening 1492 may be different shapes, different sizes, or a combination thereof. In some implementations, aperture 1401 is associated with a through channel that extends between first opening 1491 and second opening 1492. The through channel may define a flow path and be configured to enable or support a flow, such as a flow of a liquid (e.g., a fluid). It is noted that a size or shape of aperture 1401 between first opening 1491 and second opening 1492 may designed to support being coupled to two or more components (e.g., fittings, such as a hose, a manifold, a mechanical device, etc.) to be coupled using coupling 1400.

Coupling 1400 further includes a threaded bore 1403 formed in and extending through second coupling section 1404 into aperture 1401. Coupling 1400 may also include a pushing bolt 1407 configured to engage threaded bore 1403 of second coupling section 1404 and extend through threaded bore 1403 and into aperture 1401 formed by first coupling section 1402 and second coupling section 1404 to apply an unlocking force on an object (e.g., a component) positioned inside aperture 1401. In some implementations, the unlocking force applied on the object positioned inside aperture 1401 enables the object to change from a seized state with coupling 1400 to an unseized state with coupling 1400. To illustrate, while the object is coupled to coupling 1400, the object may transition from an unseized state with respect to coupling 1400 to a seized state with respect to coupling 1400. For example, coupling 1400 and the object may be used in an industrial application or a cryogenic application in which flow, such as flow of fluid, occurs via the object, coupling 1400, or both. The flow may cause the seized state—e.g., based on thermal changes (e.g., heat transfer) between the object and the flow, coupling 1400 and the flow, or a combination thereof. Accordingly, after the flow is stopped and coupling 1400 is to be removed from the object, the unlocking force may be applied when the object is in the seized state with coupling 1400.

In some implementations, coupling 1400 may include one or more fasteners, such as a first fastener 1424. First fastener 1424 may include or correspond to fastener 122, 124, or 222. First fastener 1424 may be a jack screw, as an illustrative, non-limiting example. First fastener 1424 is configured to engage a threaded bore 1405 formed in second coupling section 1404 and move first coupling section 1402 and second coupling section 1404 towards each other when a closing force is applied to first fastener 1424. Threaded bore 1405 may include or correspond to bore 142. Although describes as threaded bore 1404, in some implementations, threaded bore 1405 may not be threaded—i.e., may be an unthreaded bore.

In some implementations, the unlocking force is applied to the object positioned inside aperture 1401 in a threaded region, such as region 1495 as shown in FIG. 14E, of second coupling section 1404. Alternatively, in other implementations, the unlocking force is applied to the object positioned inside aperture 1401 in an unthreaded region. In some implementations, such as shown at least with reference to FIG. 14D, pushing bolt 1407 is configured to extend into aperture 1401 beyond an inner surface of second coupling section 1404 a predetermined distance. In some implementations, coupling 1400 may include multiple pushing bolts, multiple threaded bores 1403, or a combination thereof.

In some implementations, coupling 1400 includes a first contact surface 1481 formed on first coupling section 1402 and a second contact surface 1482 formed on second coupling section 1404. Additionally, coupling 1400 may include a stepped bore 1420 formed in first coupling section 1402. In some implementations, stepped bore 1420 is coaxial with threaded bore 1405 of second coupling section 1404. Stepped bore 1420 may include a first section 1421 formed in stepped bore 1420, and a second section 1422 formed in stepped bore 1420. First section 1421 and second section 1422 may be coaxial. Additionally, or alternatively, first section 1421 may have a first diameter and second section 1422 may have a second diameter. The second diameter of second section 1442 may be greater than the first diameter of first section 1421. In some implementations, a portion of first fastener 1424 is situated inside stepped bore 1420, such as shown in FIG. 14D.

In some implementations, first contact surface 1481 and second contact surface 1482 of coupling 1400 directly contact each other when the closing force is applied to first fastener 1424, and first contact surface 1481 and second contact surface 1482 separate from each other when the opening force is applied to first fastener 1424. Additionally, or alternatively, the closing force may be applied to first fastener 1424 in a first direction, the opening force may be applied to first fastener 1424 in a second direction (that is opposite the first direction), first section 1421 and second section 1422 are coaxial, and the second diameter of second section 1422 is greater than the first diameter of first section 1421.

In some implementations, a snap ring 1460 is coupled (e.g., attached) to first fastener 1424. Snap ring 1460 may have a diameter larger than the first diameter of first section 1421 of stepped bore 1420 (and smaller than the second diameter of stepped bore 1420. Snap ring 1460 may include or correspond to snap ring 160. Accordingly, snap ring 1460 may be configured to be positioned within a cavity corresponding to second section 1422. In some aspects, the first fastener is a jack screw. In some implementations, coupling 1400 may include one or more washers, such as washer 130 or washer 161.

In some implementations, a method of mechanically decoupling two or more components, such as a first mechanical device from a second mechanical device uses a coupling device, such as coupling 1400. For example, the method may include or correspond to a process described further herein at least with reference to FIG. 12. The method may include applying a loosening force to first fastener 1424, such as an unlocking bolt, of coupling 1400 and applying an unlocking force to pushing bolt 1407 of coupling 1400. The unlocking force may be applied to first fastener 1424 or pushing bolt 1407 by an operator. The method may also include determining whether coupling 1400 can be removed from the first and second mechanical devices by hand operation. The method may further include applying a second unlocking force to pushing bolt 1407 based on determining whether coupling 1400 can be removed from the first and second mechanical devices by hand operation. The method may include decoupling the first and second mechanical devices by rotating coupling 1400 by hand operation or by using a tool.

In some implementations, a method of mechanically coupling two or more components, such as a first mechanical device and a second mechanical devices uses a coupling device, such as coupling 1400. For example, the method may include or correspond to a process described further herein at least with reference to FIG. 11. The method of mechanically coupling may be performed before or after the method of mechanically decoupling described above. The method may include installing coupling 1400 on the first mechanical device via a first end of coupling 1400. Installing coupling on the first mechanical device may include operating one or more fasteners, such as fastener 1424, to bring first coupling section 1402 and second coupling section 1404 into contact. The method may also include examining the threaded bore 1403 to ensure that pushing bolt 1407 does not extend through an inner surface of second coupling section 1404 into aperture 1401. The method includes coupling the second mechanical device to coupling 1400 via a second end of coupling 1400 that is opposite the first end. Once coupling 1400 is coupled to the two or more components, a flow path is established between the two or more components and a flow (e.g., a fluid) may be communicated between the first mechanical component and the second mechanical component via the flow path.

Although coupling 1400 is described as first coupling section 1402 including stepped bore 1420 and second coupling section 1404 including bore 1405, in other implementations, first coupling section 1402 may include bore 1405 and second coupling section may include stepped bore 1420. Accordingly, the description of coupling 1400 is not intended to be limiting. Additionally, or alternatively, in some implementations, coupling 1400 may include one or more protrusions and one or more cavities, such as protrusion 171 and cavity 172.

It is noted that one or more couplings, such as coupling 100, 200, 300, or 400 may be modified or adapted to include a threaded bore and a pushing bolt, such as threaded bore 1403 and pushing bolt 1407, respectively. The pushing bolt may be configured to apply an unlocking force as described with reference to FIGS. 14A-14E.

Figure 9A:
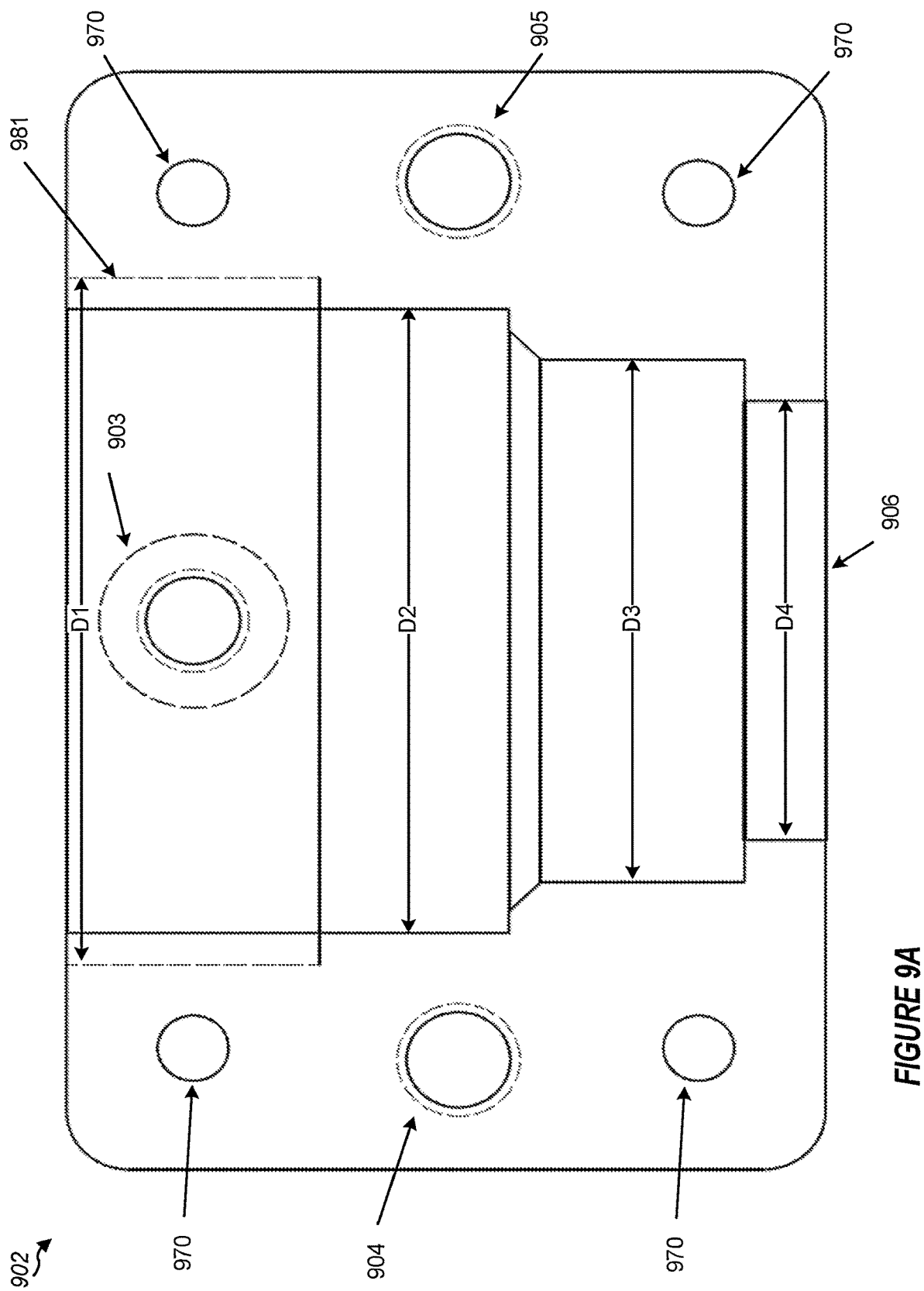
FIGS. 9A-9D are coupling sections according to one or more aspects.
Figure 9B:
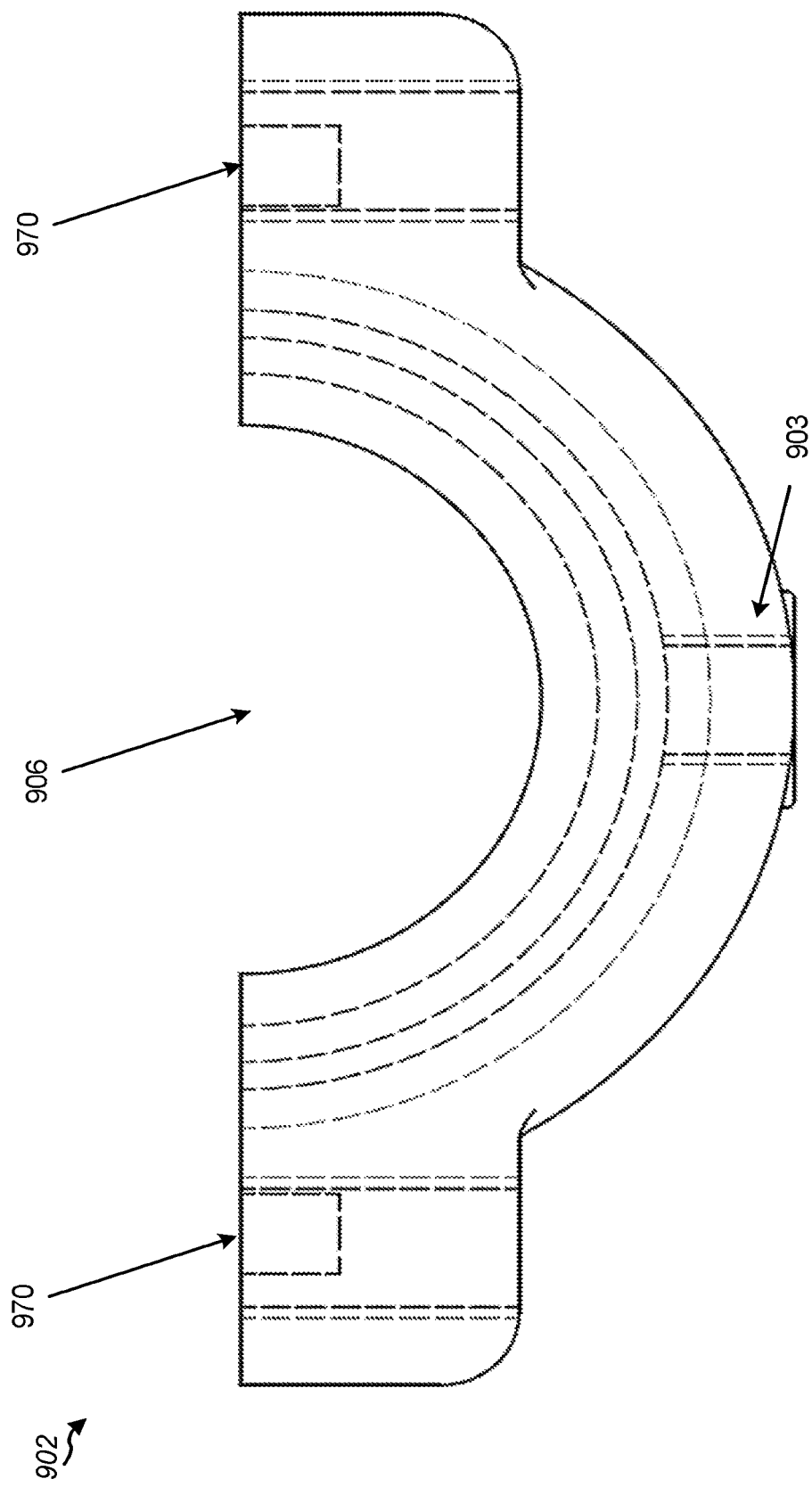
Figure 9C:
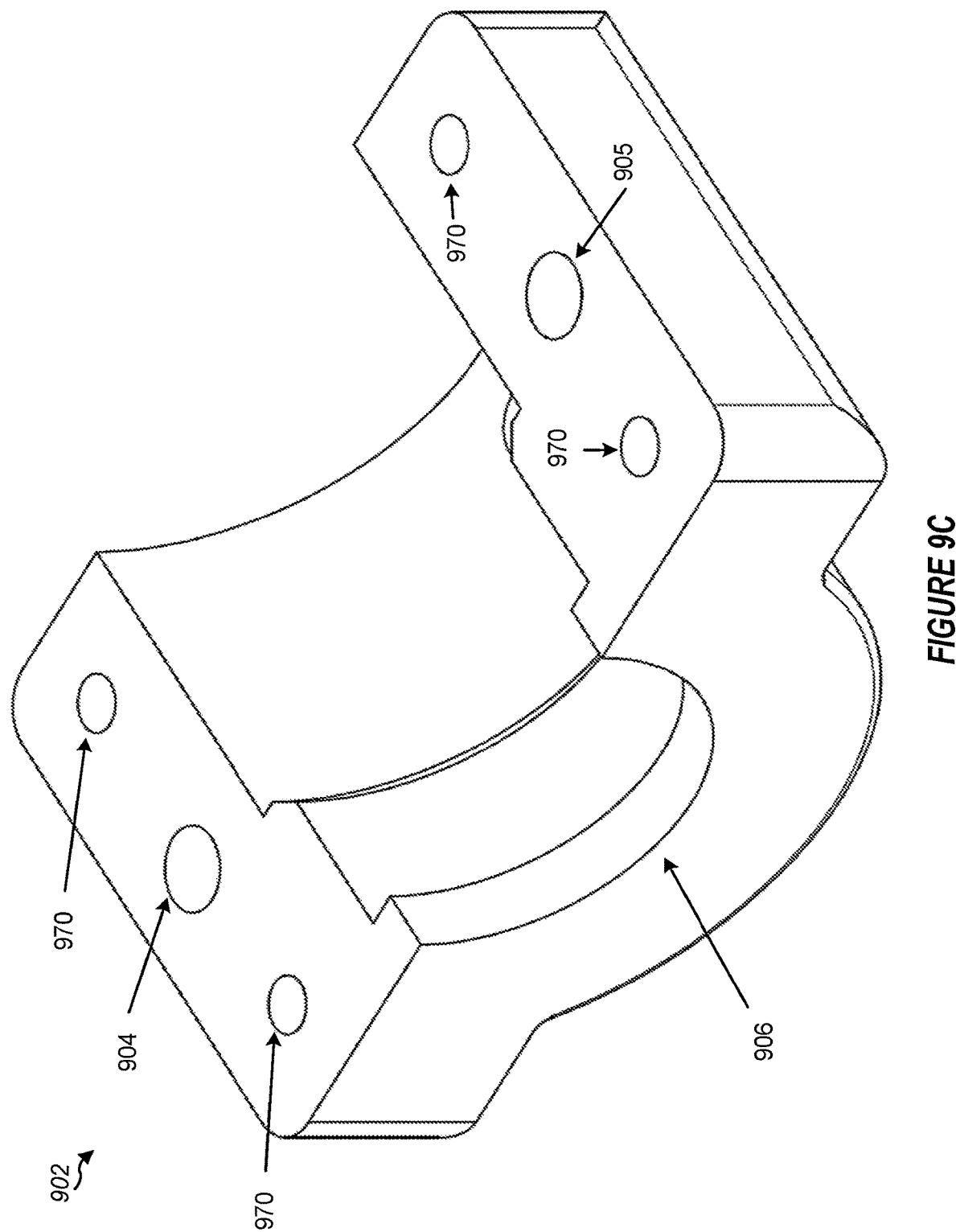
Figure 9D:
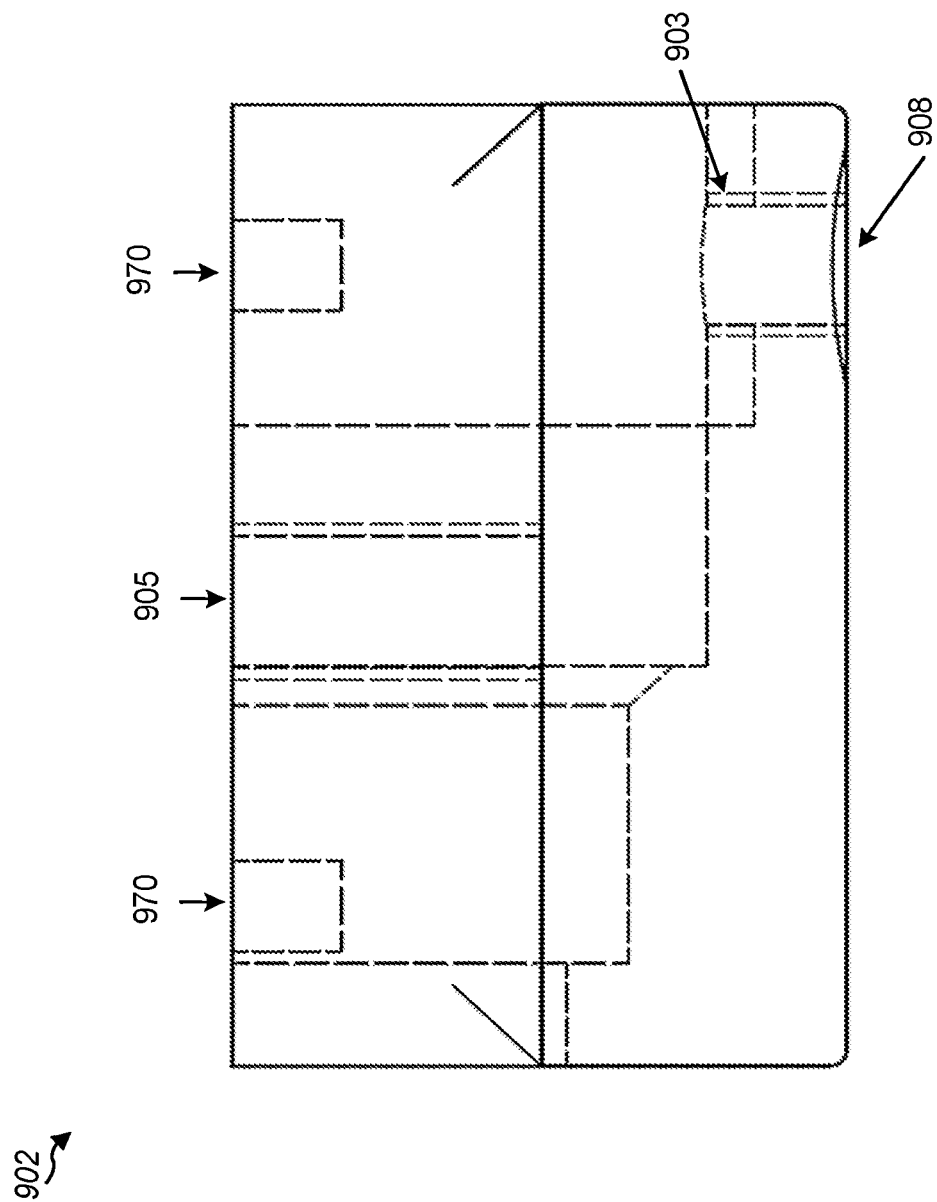

FIGS. 9A-9D show coupling sections according to one or more aspects. For example, FIGS. 9A-9D show coupling section 902 with threaded bore 903 formed in coupling section 902. Coupling section 902 may include or correspond to second coupling section 1404. Threaded bore 903 may include or correspond to threaded bore 1403. FIG. 9A shows a bottom view of coupling section 902. FIG. 9B shows a cross section view of coupling section 902. FIG. 9C shows a perspective view of coupling section 902. FIG. 9D shows a side cross section view of coupling section 902. Coupling section 902 may be configured to couple with another coupling section, such as a coupling section 944 described with reference to at least FIG. 14A, to form a coupling (e.g., a coupling device).

As shown in FIGS. 9A-9D, threaded bore 903 extends from an outer surface of coupling section 902 to an inner surface of coupling section 902. Threaded bore 903 is configured to receive a pushing bolt, such as pushing bolt 1407.

Coupling section 902 may also include threaded bores 904 and 905, which may be configured to receive fastening means to connect coupling section 902 to a second coupling section (e.g., coupling section 944). Threaded bores 904 and 905 may include or correspond to bore 1405. Threaded bores 904 and 905 are configured to receive a fastener, such as a fastener 122, 124, or 222, or 1424.

Coupling section 902 may also include cavities 970, which may be configured to receive alignment dowels. Cavities 970 may include or correspond to cavities 172. Threaded bores 903, 904, and 905 may be positioned in the same direction, i.e., perpendicular to axis of an aperture 906, such that an axis 997 extending through a center of threaded bore 903, an axis 998 extending through a center of threaded bore 904, and an axis 999 extending through a center of threaded bore 905 are all parallel. Alternatively, threaded bore 903 may be positioned in a different direction than threaded bores 904 and 905. As shown in FIG. 9D, threaded bore 903 may have diameter 908. Aperture 906 may include or correspond to aperture 1401.

Aperture 906, which may be formed when coupling section 902 is coupled to another coupling section (e.g., 944) to form at least part of a coupling 900, may be associated with a first opening on a first side of coupling 900 (e.g., coupling section 902) and a second opening on a second side of coupling 900 (e.g., coupling section 902). The first opening may be associated with a threaded bore having a first diameter D1 (e.g., a thread diameter) and a second diameter D2 (e.g., not including the threads). The second opening may be associated with a bore having a fourth diameter D4. Between the first opening and the second opening, aperture 906 may include one or more regions with a different diameter, such as a third diameter D3. It is noted that diameters D1-D4 may be different from diameters D1-D4 described with reference to coupling 100 of FIG. 4B.

It is noted that when coupling section 902 is coupled to another coupling section (e.g., 944) to form at least part of coupling 900, aperture 906 may include or correspond to a through channel between first opening and second opening.

Additionally, or alternatively, when coupling 900 is in a coupled state with two components, such as a first component via the second opening and a first component via the first opening, a flow path may be established between the first component and the second component, such that a flow (e.g., of a fluid) may be exchanged between the first component and the second component. In some implementations, a portion of the flow path may be defined by coupling 900. It is noted that when the flow path may be established between the first component and the second component, the flow (e.g., fluid thereof) is not permitted or able to travel through threaded bore 903, whether or not a pushing bolt (e.g., 907) is inserted in threaded bore 903.

Figure 10A:
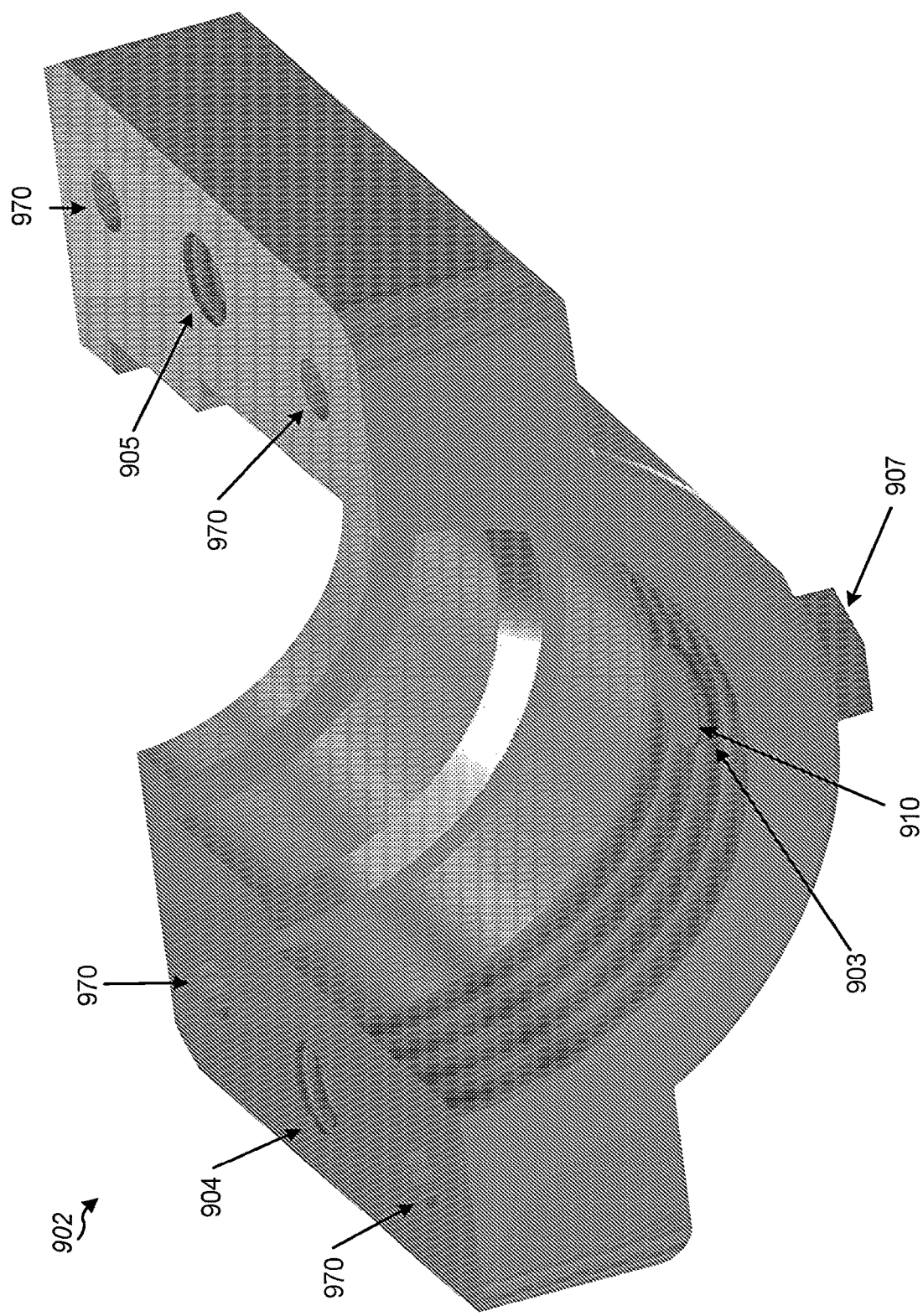
FIGS. 10A and 10B are coupling sections according to one or more aspects.
Figure 10B:
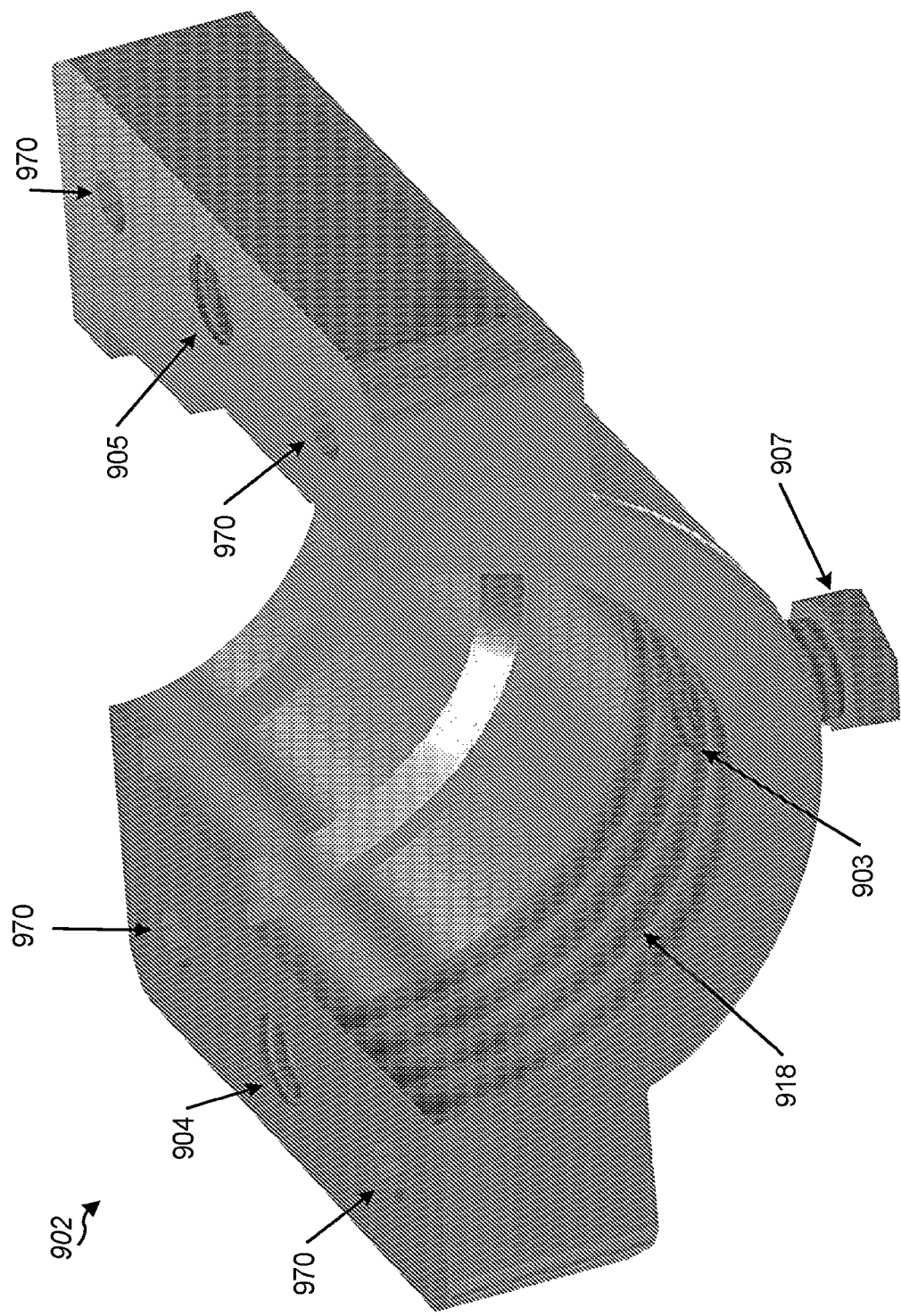

FIGS. 10A and 10B show coupling sections according to one or more aspects. For example, FIGS. 10A and 10B show perspective views of coupling section 902 with threaded bore 903 and pushing bolt 907. Pushing bolt 907 may include or correspond to pushing bolt 1407. As shown in FIG. 10A, pushing bolt 907 is extended through threaded bore 903 and decoupling coupling section 902 a predetermined distance 910 beyond the inner surface of coupling section 902, so that a pushing force may be applied to an object positioned inside aperture 906 via pushing bolt 907. As shown in FIG. 10B, pushing bolt 907 has been disengaged from aperture 906 and is in an opened position, so as not to apply a pushing force on an object positioned inside aperture 906. Pushing bolt 907 may be engaged and disengaged from exerting a force onto an object, for example, by applying a rotational force to pushing bolt 907.

As shown in FIGS. 10A and 10B, threaded bore 903 may be positioned in threaded region 918 of coupling section 902 so that the pushing force exerted by pushing bolt 907 is applied to a threaded portion of an object positioned inside aperture 906. Alternatively, threaded bore 903 may not be positioned in a threaded region 918 of coupling section 902.

Figure 13A:
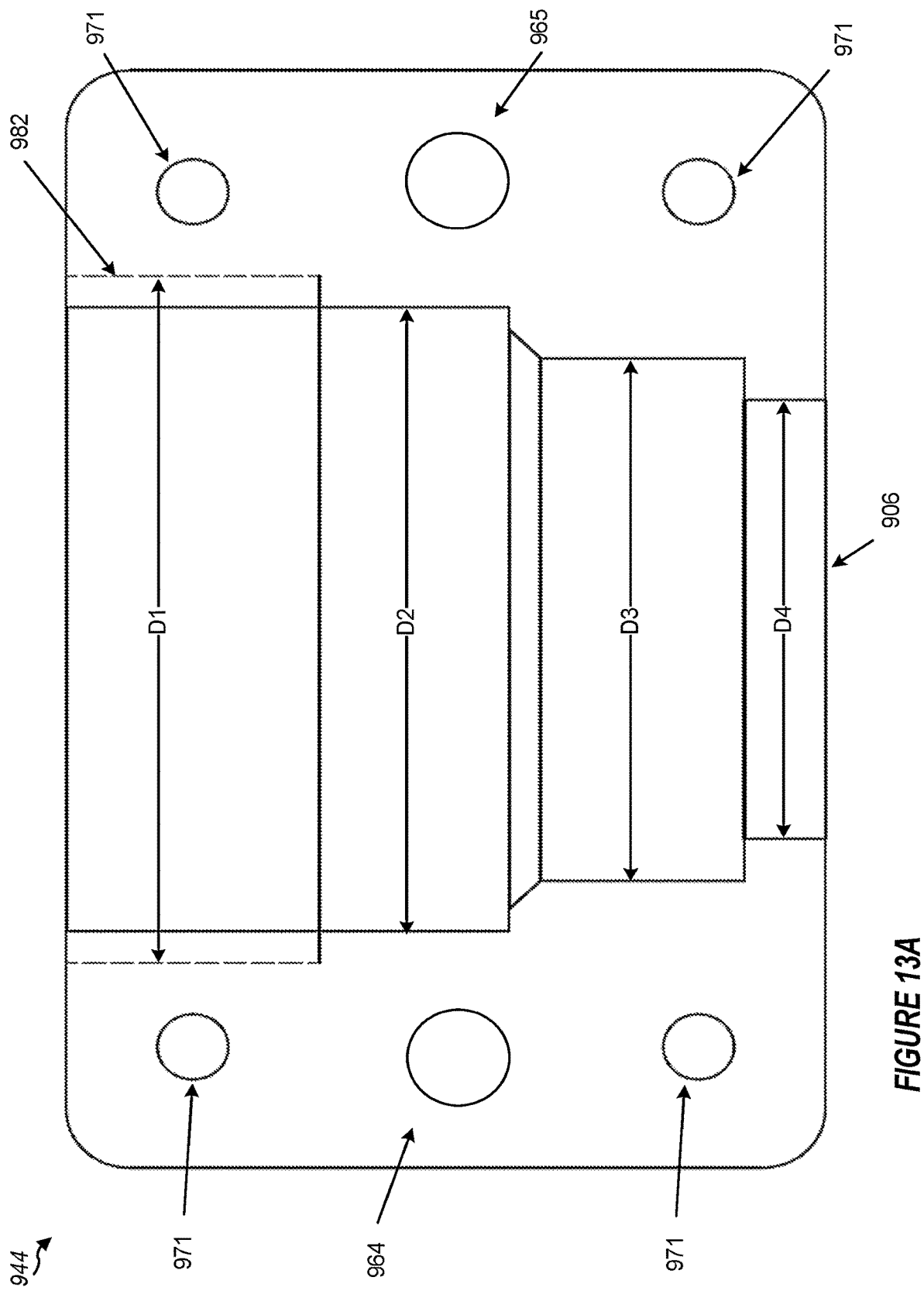
FIGS. 13A-13C are coupling sections according to one or more aspects.
Figure 13B:
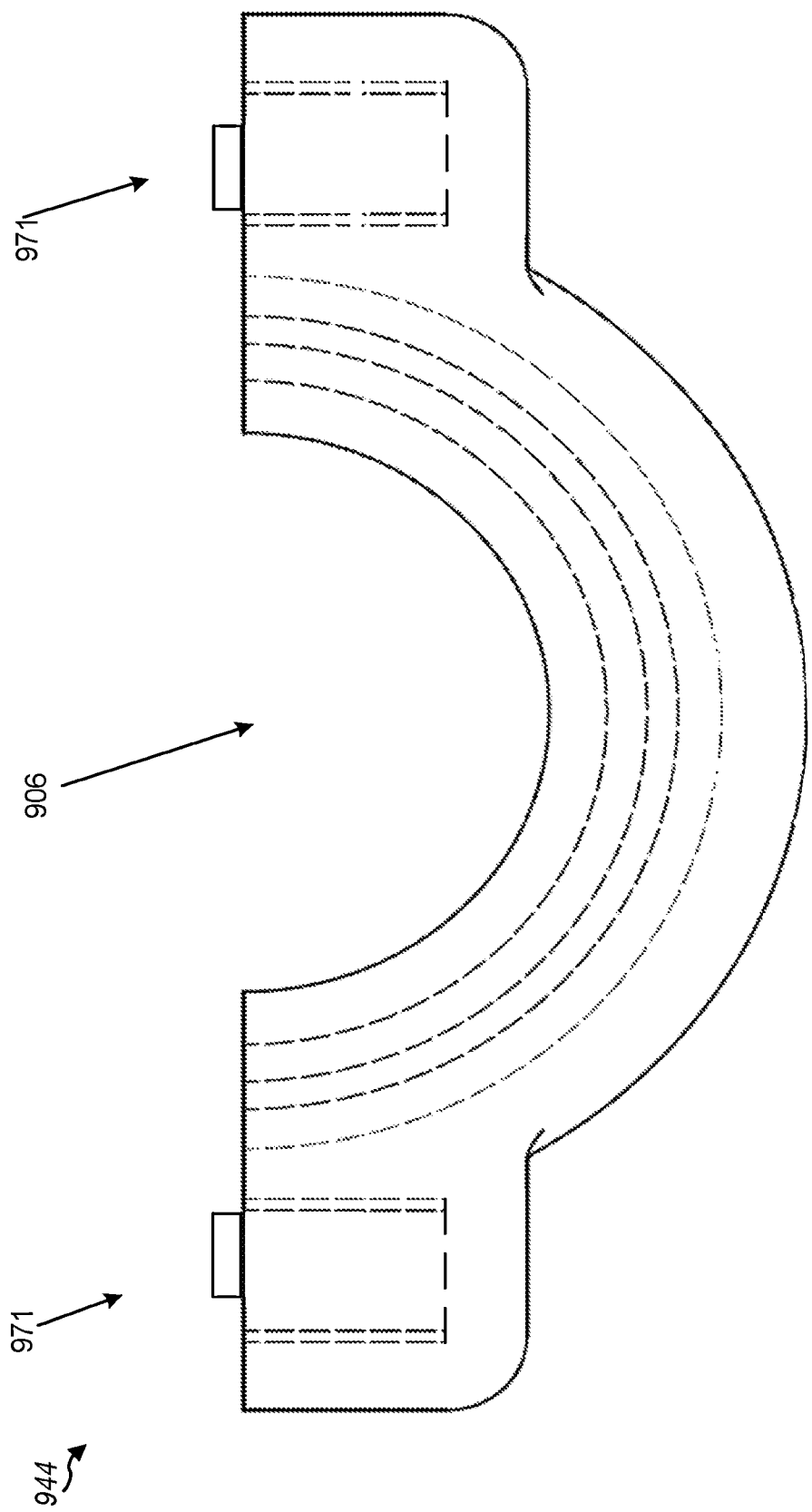
Figure 13C:
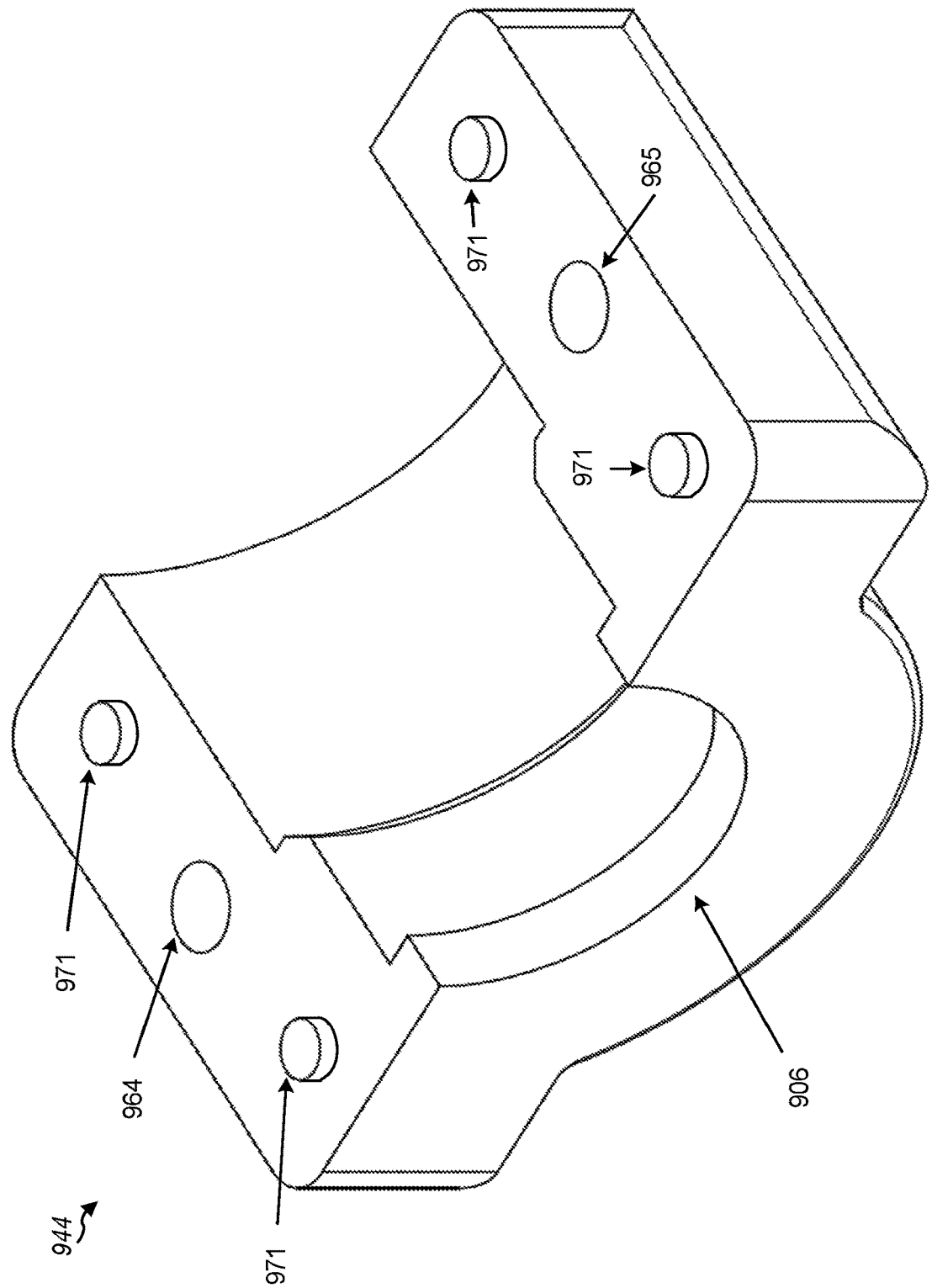
Figure 13D:
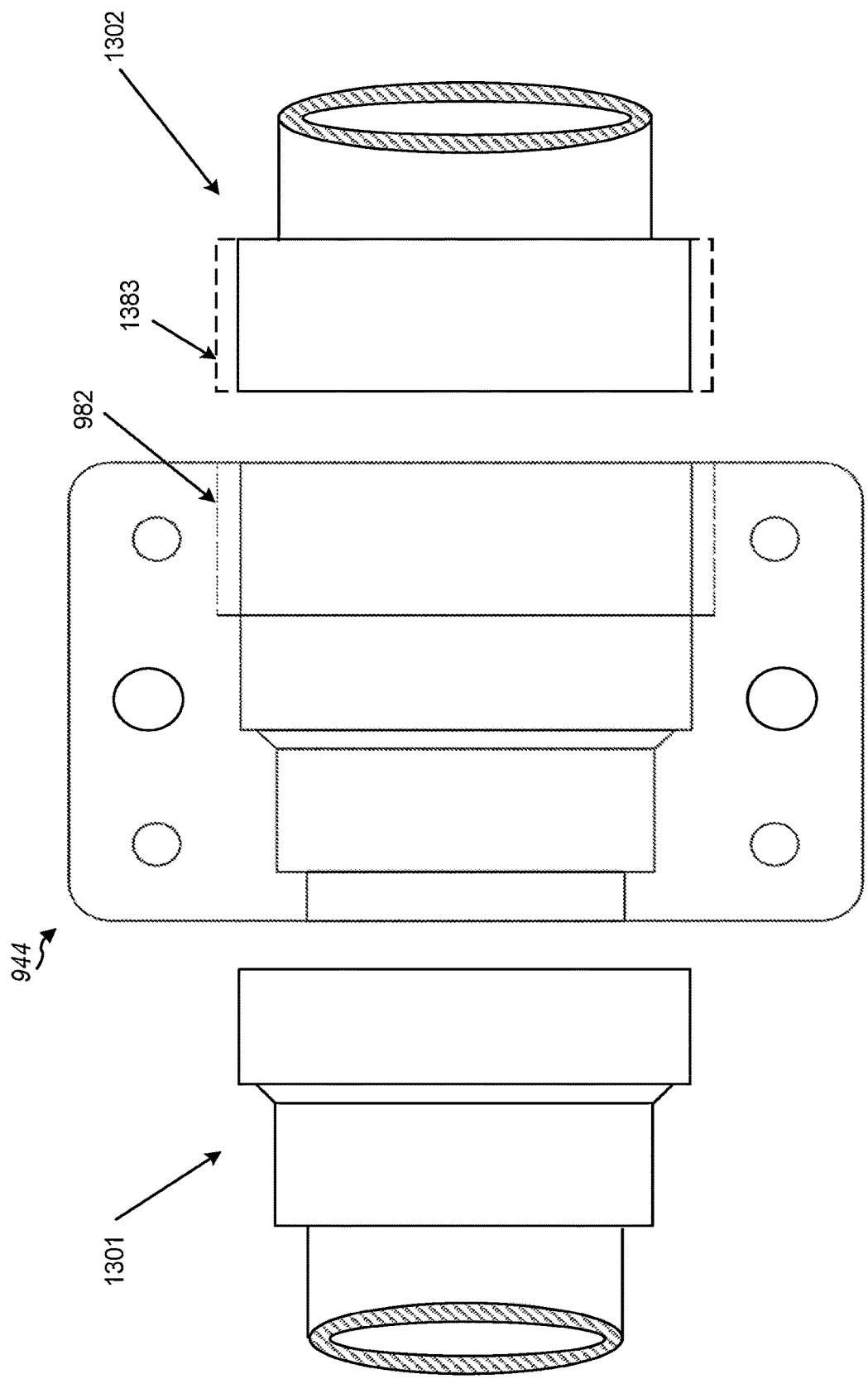
FIG. 13D is the coupling section of FIGS. 13A-13C and fittings according to one or more aspects.

Referring to FIGS. 13A-13C, FIGS. 13A-13C are coupling sections according to one or more aspects. Additionally, FIG. 13D is the coupling section of FIGS. 13A-13C and fittings according to one or more aspects. Further, FIG. 13E is a coupling including the coupling section of FIGS. 9A-9D and the coupling section of FIGS. 13A-13C according to one or more aspects.

Referring to FIGS. 13A-13C, a coupling section 944 is shown. Coupling section 944 may include or correspond to first coupling section 1402. FIG. 13A shows a bottom view of coupling section 944. FIG. 13B shows a side view of coupling section 944. FIG. 13C shows a perspective view of coupling section 944. Coupling section 944 may be configured to couple with another coupling section, such as coupling section 902 described with reference to at least FIG. 9A, to form a coupling 900 (e.g., a coupling device).

Coupling section 944 may also include threaded bores 964 and 965, which may be configured to receive fastening means to connect coupling section 944 to another coupling section (e.g., coupling section 902). Threaded bores 964 and 965 may include or correspond to stepped bore 1420 or a bore that is not stepped. Threaded bores 964 and 965 are configured to receive a fastener, such as a fastener 122, 124, or 222, or 1424. For example, with reference to FIG. 13E, the fastener may include a fastener 1322 or 1324. In some implementations, faster 1322 or 1324 may be coupled to a snap ring, such as snap ring 160 or 1460.

Coupling section 944 may also include protrusion 971, such as an alignment dowel, configured to be received by cavities 970. Protrusion 971 may include or correspond to protrusion 171. Threaded bores 964 and 965 may be positioned in the same direction, i.e., perpendicular to axis of aperture 906.

Referring to FIG. 13A, aperture 906, which may be formed when coupling section 902 is coupled to coupling section 944 to form at least part of a coupling 900, may be associated with a first opening on a first side of coupling 900 (e.g., coupling section 944) and a second opening on a second side of coupling 900 (e.g., coupling section 944). The first opening may be associated with a threaded bore having a first diameter D1 (e.g., a thread diameter) and a second diameter D2 (e.g., not including the threads). The second opening may be associated with a bore having a fourth diameter D4. Between the first opening and the second opening, aperture 906 may include one or more regions with a different diameter, such as a third diameter D3. It is noted that diameters D1-D4 of coupling section 944 may be the same, or substantially the same as diameters D1-D4 described with reference to coupling section 902 FIG. 9A.

Referring to FIG. 13D, coupling section 944 is configured to couple two components 1301 and 1302 together. For example, coupling section 944 and 902 may be coupled together such that an end of component 1301 is positioned in aperture 906. In some implementations, coupling section 944 (e.g., coupling 900) is configured to couple to a portion of component 1301, such as a shaft, a neck, a lip, a groove, or the like, as illustrative, non-limiting examples. After component 1301 is coupled to the coupling (e.g., 900) including coupling sections 902 and 944, coupling may be connected to component 1302. For example, a threaded region 982 of coupling section 944 (and a corresponding threaded region of coupling section 902) may be coupled to component 1302 via a threaded region 1383 of component 1302. When components 1301 and 1032 are coupled together via the coupling (e.g., 900), a flow path may be established between components 1301 and 1302 such that flow of a fluid may occur between components 1301 and 1302.

Referring to FIG. 13E, coupling 900 is shown. Coupling 900 may include or correspond to coupling 1400. Coupling includes coupling section 902 and coupling section 944. Coupling section 902 includes contact surface 1382 and coupling section 944 includes contact surface 1308.

Coupling section 902 and coupling section 944 are configured to form an aperture 906. For example, aperture 906 may be formed when coupling section 902 and coupling section 944 are coupled together in a coupled state. In some implementations, aperture 906 may include or be associated with a first opening and a second opening. The first opening may be on a first side of coupling 900 and the second opening may be on a second side of coupling 900 that is opposite the first side. In some implementations, the first opening and the second opening are the same shape, the same size, or a combination thereof. Alternatively, the first opening and the second opening may be different shapes, different sizes, or a combination thereof. In some implementations, aperture 906 is associated with a through channel that extends between the first opening and the second opening. The through channel may define a flow path and be configured to enable or support a flow, such as a flow of a liquid (e.g., a fluid). It is noted that a size or shape of aperture 906 between the first opening and the second opening may designed to support being coupled to two or more components (e.g., fittings, such as a hose, a manifold, a mechanical device, etc.) to be coupled using coupling 900. In some implementations, the two or more components may include components 1301 and 1302.

In some implementations, bore 904 is coaxial with bore 965 such that bores 904 and 965 are configured to receive fastener 1322. For instance, axis 998 extends through both bores 904 and 965 in FIG. 13E. Additionally, or alternatively, bore 905 is coaxial with bore 964 such that bores 905 and 964 are configured to receive fastener 1324. For instance, axis 999 extends through both bores 905 and 964 in FIG. 13E.

Figure 11:
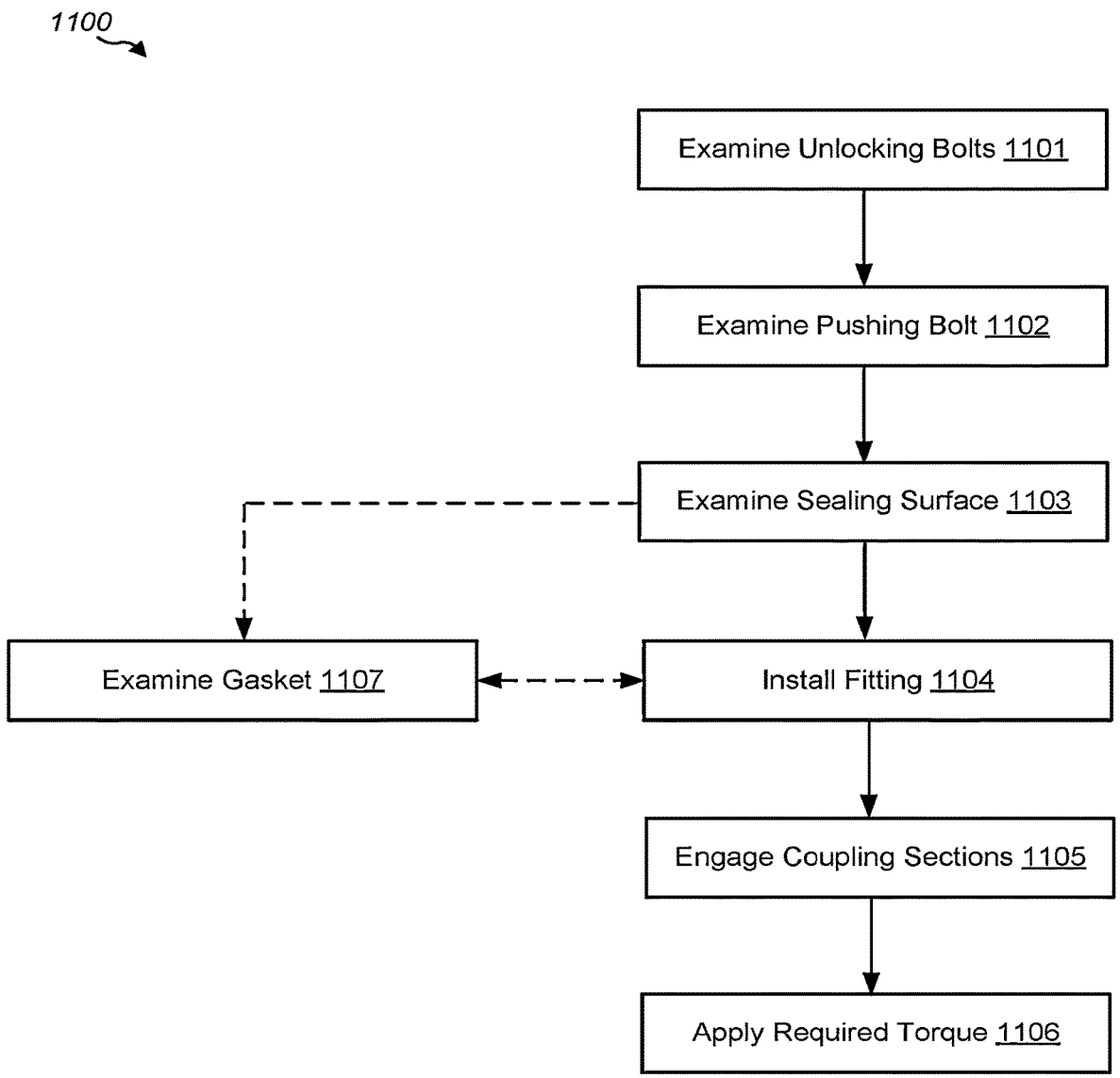
FIG. 11 is a flowchart of an example of a process of engaging a coupling according to one or more aspects.

FIG. 11 is a flowchart of an example of a process 1100 of engaging a coupling according to one or more aspects. Operations of process 1100 may be performed on a coupling (e.g., a coupling device), such as coupling 100, 200, 300, 400, 900, 1400, or a coupling including coupling section 902 or coupling section 944.

At step 1101, an operator may examine the tightness and position of a fastener, such as an unlocking bolt, of coupling device. For example, the operator may examine the tightness and position of an unlocking bolt of the coupling device to determine (1) if the unlocking bolt is bottomed into its threaded bore; and/or (2) if the coupling device is in a fully closed position. For example, the unlocking bolt may include or correspond to a fastener, such as first fastener 122, second fastener 124, fastener 222, latch fastener 322, latch fastener 422, fastener 424, fastener 1322, fastener 1324, or fastener 1424. If the coupling device includes more than one fastener (e.g., more than one unlocking bolt), then the operator may examine the tightness and position of any additional fasteners (e.g., any additional unlocking bolts). For example, the operator may examine the tightness and position of any additional unlocking blots to determine (1) if the additional unlocking bolt(s) are bottomed into its threaded bore; and/or (2) if the coupling device is in a fully closed position.

At step 1102, the operator may examine the pushing bolt to determine if the pushing bolt is disengaged. The pushing bolt may include or correspond to pushing bolt 907 or 1407.

At step 1103, the operator examines the coupling device to determine if the sealing surface is damaged. If the coupling device is coupling a gasket fitting, at step 1107, the operator ensures the gasket is in place and properly positioned. If the fitting does not have a gasket, step 1104 may follow step 1103. The fitting may include or correspond to component 1301.

At step 1104, the operator installs a first fitting to be coupled into the coupling device by manually pushing the sealing surfaces of the coupling device (either with a gasket or without a gasket) against each other so that the sealing surfaces are pushed against each other in the correct position. The first fitting may include or correspond to component 1301. In some implementations, the coupling device is configured to be coupled to the first fitting via a first end of the coupling device.

At step 1105, the operator engages the coupling device by hand rotating the coupling device around a second fitting to be coupled in either a clockwise direction or a counterclockwise direction. For example, coupling device may be rotated around the second fitting to be coupled to a minimum of hand tightness. Second fitting may include or correspond to component 1302. In some implementations, the coupling device is configured to be coupled to the second fitting via a second end of the coupling device. The second end of the coupling device may be opposite the first end of the coupling device.

At step 1106, after the coupling device has been engaged by hand tightness, the operator may then apply additional torque by means of a tool, e.g., wrench, etc., so as to reach a threshold torque value. After the coupling device is installed, a flow path is established between the first fitting and the second fitting. In some implementations, the flow path is further established or defined by the coupling device. Additionally, after the coupling device is installed, flow may occur via the flow path, such as a flow of a fluid via the flow path.

Figure 12:
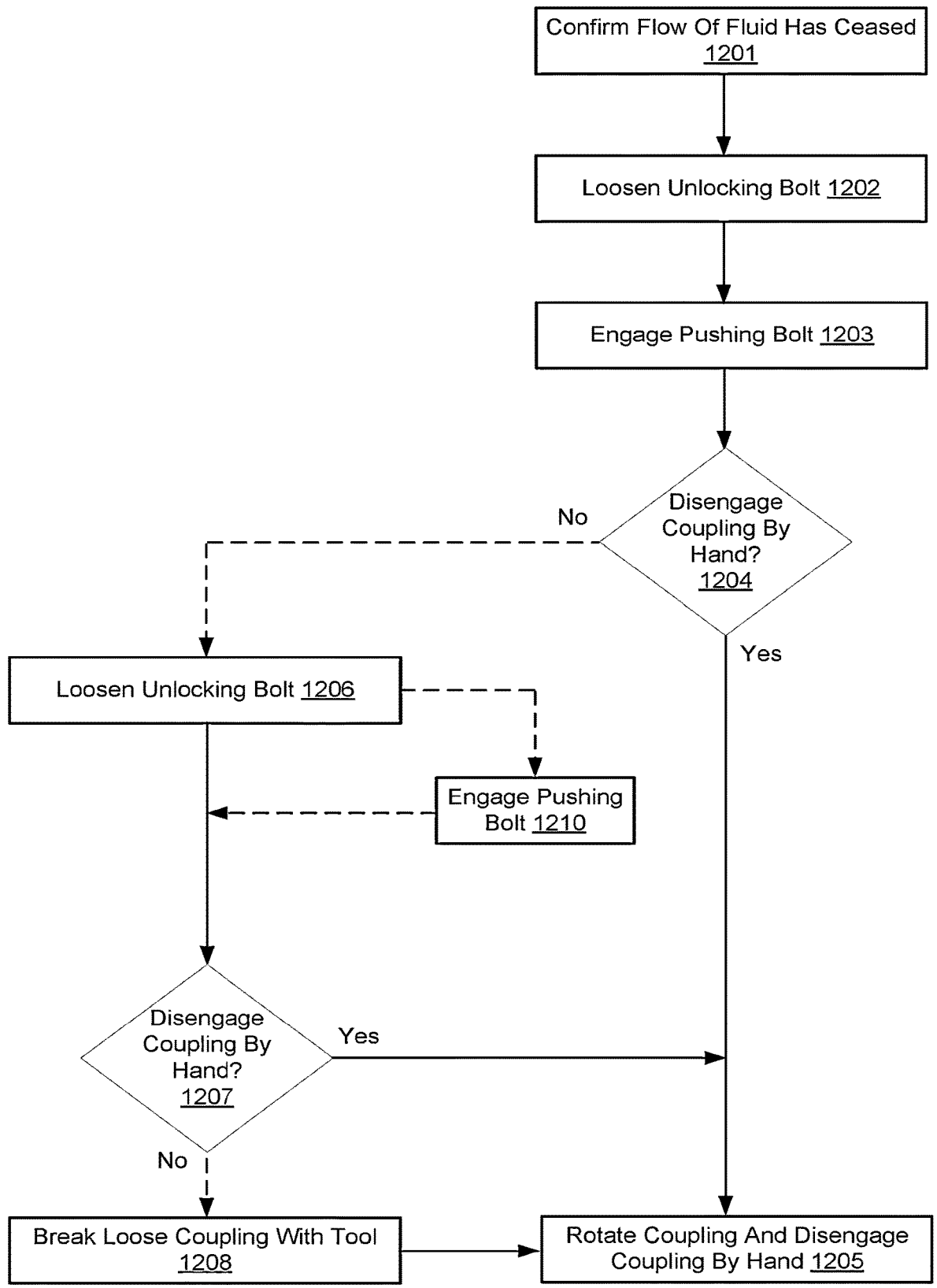
FIG. 12 is a flowchart of an example of a process of disengaging a coupling according to one or more aspects.

FIG. 12 is a flowchart of an example of a process of disengaging a coupling according to one or more aspects. Operations of process 1200 may be performed on a coupling (e.g., a coupling device), such as coupling 100, 200, 300, 400, 900, 1400, or a coupling including coupling section 902 or coupling section 944.

At step 1201, an operator may confirm the flow of fluid through a fitting (e.g., one or more mechanical devices) has ceased. The fitting is coupled to a coupling device. For example, the fitting may include or correspond to component 1301 or component 1302.

At step 1202, the operator may loosen a fastener, such as an unlocking bolt, of the coupling device. For example, the operator may loosen an unlocking bolt of the coupling device. The unlocking bolt may include or correspond to a fastener, such as first fastener 122, second fastener 124, fastener 222, latch fastener 322, latch fastener 422, fastener 424, fastener 1322, fastener 1324, or fastener 1424. If the coupling device includes more than one unlocking bolt, the operator may loosen the additional unlocking bolt(s). For example, an operator may loosen an unlocking bolt by rotating the unlocking bolt two complete turns.

At step 1203, the operator may engage pushing bolt of the coupling device. The pushing bolt may include or correspond to pushing bolt 907 or 1407. For example, the operator may loosen a pushing bolt of the coupling device. For example, operator may rotate pushing bolt one complete turn inwards towards the fitting.

At step 1204, the operator may attempt to disengage the coupling device by applying a force without the use of a tool (i.e., by hand). If, at step 1204, the operator is able to remove the coupling device without the use of a tool, then the operator may proceed to step 1205, at which the operator disengages the coupling device from the fitting with the use of a tool (i.e., by hand). In this manner, an operator may safely disengage a coupling device and separate two mechanical devices without using a large force to separate the coupling device (i.e., without the use of a wrench or hammer to "break lose" the mechanical devices). Using such large forces significantly increases the chance of the operator injuring him/herself, damaging the coupling devices, and/or damaging the mechanical devices being coupled. Avoiding these large forces protects both the operator and the mechanical components.

If the operator is unable to disengage coupling device, then at step 1206, the operator may loosen the unlocking bolt again by rotating the unlocking bolt one complete turn. Alternatively or in addition to step 1206, the operator may engage pushing bolt again, at 1210, by rotating pushing bolt one complete turn inwards towards the fitting.

At step 1207, operator may attempt to disengage the coupling device again by applying a force without the use of a tool (i.e., by hand). If the operator is unable to disengage coupling device, then at step 1208, the operator may use a tool (e.g., a wrench) to rotate the coupling device until the coupling device becomes loose enough to rotate by hand. At step 1205, the operator removes coupling device from fitting by hand.

It is noted that one or more blocks (or operations) described with reference to FIG. 11 or 12 may be combined with one or more blocks (or operations) described with reference to another of the figures. For example, one or more blocks (or operations) of FIG. 11 may be combined with one or more blocks (or operations) of FIG. 12. As another example, one or more blocks associated with FIG. 11 or 12 may be combined with one or more aspects, components, or couplings described with reference to FIG. 1-3, 4A, 4B, 5-8, 9A-9D, 10A, 10B, 13A-13E, or 14A-14E.

In one or more aspects, a coupling may include additional aspects, such as any single aspect or any combination of aspects described below or in connection with one or more other processes or devices described elsewhere herein. In a first aspect, a coupling may include a first coupling section and a second coupling section. The first and second coupling sections forming an aperture. The coupling may further include a threaded bore formed in and extending through the second coupling into the aperture. The coupling may also include a pushing bolt. The pushing bolt is configured to engage the threaded bore of the second coupling, and extend through the threaded bore and into the aperture formed by the first and second coupling sections to apply an unlocking force on an object positioned inside the aperture.

In a second aspect, in combination with the first aspect, the unlocking force is applied to the object positioned inside the aperture in a threaded region of the second coupling section.

In a third aspect, in combination with the first aspect, the pushing bolt is configured to extend into the aperture beyond an inner surface of the second coupling section a predetermined distance.

In a fourth aspect, in combination with the first aspect, the coupling further includes a hinge.

In a fifth aspect, in combination with the first aspect, the coupling further includes a first fastener.

In a sixth aspect, in combination with the fifth aspect, the first fastener is configured to engage a second threaded bore formed in the second coupling section.

In a seventh aspect, in combination with the fifth aspect or the sixth aspect, the first fastener is configured to move the first coupling section and the second coupling section towards each other when a closing force is applied to the first fastener.

In an eighth aspect, in combination with one or more of the fifth aspect through the seventh aspect, the coupling further includes a second fastener.

In a ninth aspect, in combination with one or more of the fifth aspect through the seventh aspect, the coupling further includes a hinge.

In a tenth aspect, in combination with one or more of the fifth aspect through the seventh aspect, the first fastener is a jack screw.

In an eleventh aspect, in combination with one or more of the fifth aspect through the seventh aspect, the coupling further includes a first contact surface formed on the first coupling section.

In a twelfth aspect, in combination with the eleventh aspect, the coupling further includes a second contact surface formed on the second coupling section.

In a thirteenth aspect, in combination with the twelfth aspect, the coupling further includes a stepped bore formed in the first coupling section.

In a fourteenth aspect, in combination with the thirteenth aspect, the stepped bore being coaxial with the second threaded bore of the second coupling section.

In a fifteenth aspect, in combination with the fourteenth aspect, the first fastener is situated inside the stepped bore.

In a sixteenth aspect, in combination with the fifteenth aspect, the coupling includes a first section formed in the stepped bore. The first section may have a first diameter.

In a seventeenth aspect, in combination with the sixteenth aspect, the coupling includes a second section formed in the stepped bore. The second section may have a second diameter.

In an eighteenth aspect, in combination with the seventeenth aspect, the first contact surface and the second contact surface directly contact each other when the closing force is applied to the first fastener.

In a nineteenth aspect, in combination with the eighteenth aspect, the first contact surface and the second contact surface separate from each other when the opening force is applied to the first fastener.

In a twentieth aspect, in combination with the nineteenth aspect, the closing force is applied to the first fastener in a first direction.

In a twenty-first aspect, in combination with the twentieth aspect, the opening force is applied to the first fastener in a second direction.

In a twenty-second aspect, in combination with the twenty-first aspect, the first section and the second section are coaxial.

In a twenty-third aspect, in combination with the twenty-second aspect, the diameter of the second section is greater than a diameter of the first section.

In a twenty-fourth aspect, in combination with the twenty-third aspect, the coupling includes a snap ring attached to the first fastener.

In a twenty-fifth aspect, in combination with the twenty-fourth aspect, the snap ring has a diameter larger than the diameter of the first section of the stepped bore.

In one or more aspects, techniques for supporting operation or use of a coupling may include additional aspects, such as any single aspect or any combination of aspects described below or in connection with one or more other processes or devices described elsewhere herein. For example, supporting operating or use of a coupling may include techniques for mechanically decoupling a first mechanical device from a second mechanical device using a coupling device. In a twenty-sixth aspect, techniques for supporting operation or use of a coupling may include applying a loosening force to an unlocking bolt of a coupling device. The techniques may further include applying an unlocking force to a pushing bolt of the coupling device, the unlocking force being applied by an operator. The techniques may also include determining whether the coupling device can be removed from the first and second mechanical devices by hand operation. The techniques may include applying a second unlocking force to the pushing bolt based on the determining whether the coupling device can be removed from the first and second mechanical devices by hand operation. The techniques may further include decoupling the first and second mechanical devices by rotating the coupling device by hand operation. In some examples, the techniques in the twenty-sixth may be implemented in a method or process.

In a twenty-seventh aspect, in combination with the twenty-sixth aspect, the unlocking force is applied to at least one of the first and second mechanical objects positioned inside a threaded region of the second coupling section.

In a twenty-eighth aspect, in combination with the twenty-sixth aspect, the coupling device includes: a first coupling section.

In a twenty-ninth aspect, in combination with the twenty-eighth aspect, the coupling device includes a second coupling section.

In a thirtieth aspect, in combination with the twenty-ninth aspect, the first and second coupling sections form an aperture.

In a thirty-first aspect, in combination with the thirtieth aspect, the coupling device includes a threaded bore formed in and extending through the second coupling into the aperture.

In a thirty-second aspect, in combination with the thirty-first aspect, the pushing bolt is configured to: engage the threaded bore of the second coupling.

In a thirty-third aspect, in combination with the thirty-second aspect, the pushing bolt is configured to extend through the threaded bore and into the aperture formed by the first and second coupling section to apply the unlocking force on at least one of the first and second mechanical objects positioned inside the aperture.

In a thirty-fourth aspect, in combination with the thirty-third aspect, the pushing bolt is configured to extend into the aperture of the coupling device a predetermined distance.

In a thirty-fifth aspect, in combination with the thirty-third aspect, the coupling device includes a first fastener.

In a thirty-sixth aspect, in combination with the thirty-fifth aspect, the first fastener is configured to engage a second threaded bore formed in the second coupling section.

In a thirty-seventh aspect, in combination with the thirty-fifth aspect or the thirty-sixth aspect, the first fastener is configured to move the first coupling section and the second coupling section towards each other when a closing force is applied to the first fastener.

In a thirty-eighth aspect, in combination with one or more of the thirty-fifth aspect through the thirty-seventh aspect, the first fastener is a jack screw.

In a thirty-ninth aspect, in combination with one or more of the first aspect through the thirty-eighth aspect, the coupling device includes the coupling device of one or more of the first aspect through the twenty-fifth aspect.

While operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. Additionally, some other implementations are within the scope of the following claims. In some cases, the actions recited in the claims may be performed in a different order and still achieve desirable results.

Any aspect or example of the disclosed devices, systems, or methods can consist of or consist essentially of—rather than comprise, include, contain, or have—any of the described elements, features, or steps. Thus, in any of the claims, the term "consisting of" or "consisting essentially of" can be substituted for any of the open-ended linking verbs recited above.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

As used herein, including in the claims, the term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

As used herein, including in the claims, the use of the word "a" or "an" when used in conjunction with the term "comprising" in the claims or the specification may mean "one," but it is also consistent with the meaning of "one or more," "at least one," and "one or more than one."

Although the present disclosure and its advantages have been described in detail, it should be understood that various changes, substitutions and alterations can be made herein without departing from the spirit and scope of the disclosure as defined by the appended claims. It should be noted that any of the various feature(s) disclosed in the detailed description may be excluded from any one of the various embodiments (i.e., a negative limitation of a particular feature) for the purpose of reducing cost, reducing complexity, increasing breathability, distinguishing from other methods and/or systems, and/or removing duplicative features that may be provided by a separate method or system, especially when the other method or system is connected with the present method and/or system. Further, various industries will require different combinations of the various features of the disclosed invention, and in particular, may need to limit or exclude certain features (i.e., a negative limitation of a various feature). Moreover, the scope of the present application is not intended to be limited to the particular examples of the process, machine, manufacture, composition of matter, means, methods and steps described in the specification. As one of ordinary skill in the art will readily appreciate from the present disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A coupling comprising:
   a first coupling section;
   a second coupling section, the first and second coupling sections forming an aperture, wherein the aperture includes a threaded portion;
   a threaded bore formed in and extending through the second coupling section into the threaded portion of the aperture;
   a pushing bolt configured to:
      engage the threaded bore of the second coupling section; and
      extend through the threaded bore and into the threaded portion of the aperture formed by the first and second coupling sections such that, when an object is positioned inside the aperture, the pushing bolt applies a pushing force to the object that pushes the second coupling section away from the object;
   a first fastener configured to:
      engage a second threaded bore formed in the first coupling section or the second coupling section; and
      move the first coupling section and the second coupling section towards each other when a closing force is applied to the first fastener,
      wherein the first fastener includes a jack screw; and
   a second fastener, wherein the second fastener includes a hinge, a latch, or a jack screw.

2. The coupling of claim 1, wherein the second coupling section includes a first threaded portion of the threaded portion of the aperture, and wherein the unlocking force is applied to the object positioned inside the aperture in the first threaded portion of the second coupling section.

3. The coupling of claim 1, wherein the pushing bolt is configured to extend into the aperture beyond an inner surface of the second coupling section.

4. The coupling of claim 1, wherein the second coupling section includes an outer surface and an inner surface, the inner surface having the threaded portion of the aperture, the threaded bore extends through the second coupling section from the outer surface to the inner surface, and the inner surface includes an opening of the threaded bore in the threaded portion.

5. The coupling of claim 4, wherein the threaded portion is configured to engage a threaded portion of the object positioned inside the aperture.

6. The coupling of claim 5, wherein the pushing force is applied by the pushing bolt to the threaded portion of the object.

7. The coupling of claim 6, wherein the pushing force applied on the object positioned inside the aperture enables the object to change from a seized state with the coupling to an unseized state with the coupling.

8. The coupling of claim 1, further comprising:
   a first contact surface formed on the first coupling section;
   a second contact surface formed on the second coupling section;
   a stepped bore formed in the other of the first coupling section or the second coupling section in which the second threaded bore is formed, the stepped bore being coaxial with the second threaded bore;
   wherein the first fastener is situated inside the stepped bore;
   a first section formed in the stepped bore, the first section having a first diameter; and
   a second section formed in the stepped bore, the second section having a second diameter.

9. The coupling of claim 8, wherein:
the first contact surface and the second contact surface directly contact each other when the closing force is applied to the first fastener;
the first contact surface and the second contact surface separate from each other when an opening force is applied to the first fastener;
the closing force is applied to the first fastener in a first direction;
the opening force is applied to the first fastener in a second direction;
the first section and the second section are coaxial; and
the second diameter of the second section is greater than the first diameter of the first section.

10. The coupling of claim 9, further comprising:
a snap ring attached to the first fastener, the snap ring having a diameter larger than the diameter of the first section of the stepped bore.

11. The coupling of claim 1, further comprising:
an unlocking bolt
wherein, when the coupling couples a first mechanical device and a second mechanical device:
the unlocking bolt is configured to receive a loosening force;
the push bolt is configured to receive one or more unlocking forces applied by an operator; and
the coupling is configured to be rotated by hand operation to decouple the first mechanical device and the second mechanical device.

12. The coupling of claim 1, wherein a longitudinal axis of the threaded bore is parallel with a longitudinal axis of a third threaded bore of the second coupling section.

13. The coupling of claim 12, wherein the first coupling section includes:
the second threaded bore; and
a fourth threaded bore formed in and extending through the first coupling section into the aperture.

14. The coupling of claim 13, wherein, when the first and second coupling sections are coupled together to form the aperture:
the longitudinal axis of the second threaded bore is co-axial with a longitudinal axis of the third threaded bore; and
the aperture formed by the first and second coupling sections corresponds to a first side of the coupling configured to couple a first mechanical device via a threaded connection associated with the aperture.

15. The coupling of claim 14, wherein, when the first and second coupling sections are coupled together to form the aperture:
a second aperture formed by the first and second coupling sections corresponds to a second side of the coupling that is opposite the first side, the second side of the coupling configured to couple to a second mechanical device via a non-threaded connection associated with the second aperture; and
when the first and second mechanical devices are coupled together via the coupling, the coupling is configured to support fluid transfer between the first and second mechanical devices.

16. A method of mechanically decoupling a first mechanical device from a second mechanical device using a coupling, the method comprising:
at the coupling of claim 1, performing:
applying a loosening force to a fastener of the coupling;
applying an unlocking force to the pushing bolt; and
rotating the coupling to decouple the coupling from one of the first mechanical device or the second mechanical device.

17. The method of claim 16, further comprising:
prior to applying the loosening force, mechanically coupling the first mechanical device and the second mechanical device using the coupling; and
decoupling the coupling from the other of the first mechanical device or the second mechanical device, and
wherein the unlocking force is applied to at least one of the first and second mechanical devices positioned inside the threaded portion of the aperture.

18. A method comprising:
at the coupling of claim 1, performing:
mechanically coupling a first mechanical device and a second mechanical device using the coupling; or
when the coupling mechanically couples the first mechanical device and the second mechanical device, mechanically decoupling the first mechanical device from the second mechanical device.

19. A coupling comprising:
a first coupling section;
a second coupling section, the first and second coupling sections forming an aperture, wherein the aperture includes a threaded portion;
a threaded bore formed in and extending through the second coupling section into the threaded portion of the aperture; and
a pushing bolt configured to:
engage the threaded bore of the second coupling section; and
extend through the threaded bore and into the threaded portion of the aperture formed by the first and second coupling sections such that, when an object is positioned inside the aperture, the pushing bolt applies a pushing force to the object that pushes the second coupling section away from the object;
wherein:
a longitudinal axis of the threaded bore is parallel with a longitudinal axis of a second threaded bore of the second coupling section, and
the first coupling section includes:
a third threaded bore formed in and extending through the first coupling section into the aperture; and
a fourth threaded bore.

20. The coupling of claim 19, wherein, when the first and second coupling sections are coupled together to form the aperture:
the longitudinal axis of the second threaded bore is co-axial with a longitudinal axis of the fourth threaded bore; and
the aperture formed by the first and second coupling sections corresponds to a first side of the coupling configured to couple a first mechanical device via a threaded connection associated with the aperture.

* * * * *